US012563434B2

(12) United States Patent
Khoshnevisan et al.

(10) Patent No.: US 12,563,434 B2
(45) Date of Patent: Feb. 24, 2026

(54) RESOURCE SELECTION FOR SINGLE AND MULTIPLE TRANSMIT/RECEIVE POINTS (TRP) CHANNEL STATE INFORMATION (CSI) REPORTING

(71) Applicant: QUALCOMM Incorporated, San Diego, CA (US)

(72) Inventors: Mostafa Khoshnevisan, San Diego, CA (US); Chenxi Hao, Beijing (CN); Yu Zhang, San Diego, CA (US); Lei Xiao, San Jose, CA (US); Peter Gaal, San Diego, CA (US); Jing Sun, San Diego, CA (US); Tao Luo, San Diego, CA (US); Xiaoxia Zhang, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 373 days.

(21) Appl. No.: 18/044,558

(22) PCT Filed: Oct. 16, 2020

(86) PCT No.: PCT/CN2020/121468
§ 371 (c)(1),
(2) Date: Mar. 8, 2023

(87) PCT Pub. No.: WO2022/077430
PCT Pub. Date: Apr. 21, 2022

(65) Prior Publication Data
US 2024/0015551 A1     Jan. 11, 2024

(51) Int. Cl.
*H04W 24/10*     (2009.01)
*H04L 5/00*     (2006.01)

(52) U.S. Cl.
CPC .......... *H04W 24/10* (2013.01); *H04L 5/0051* (2013.01)

(58) Field of Classification Search
CPC ........................... H04W 24/10; H04L 5/0051
See application file for complete search history.

(56) References Cited

U.S. PATENT DOCUMENTS

2016/0301505 A1* 10/2016 Furuskog .............. H04W 72/00
2017/0180100 A1   6/2017 Lee et al.
(Continued)

FOREIGN PATENT DOCUMENTS

| CN | 110050427 A | 7/2019 |
| CN | 111436223 A | 7/2020 |
| WO | WO-2019051634 A1 | 3/2019 |

OTHER PUBLICATIONS

Nokia, et al., "Enhancement on CSI Measurement and Reporting", 3GPP TSG RAN WG1 Meeting #102-e, R1-2006849, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 29, 2020, Aug. 7, 2020, 19 Pages, XP051915494, Section 2.
(Continued)

*Primary Examiner* — Zhiren Qin
(74) *Attorney, Agent, or Firm* — Holland & Hart LLP/Qualcomm

(57) ABSTRACT

This disclosure provides systems, methods and apparatus for wireless communications. In one aspect, a device, such as a user equipment (UE) may receive a configuration including one or more channel state information (CSI) measurement resources associated with a set of CSI hypotheses. The set of CSI hypotheses may correspond to a set of transmission configuration indicator (TCI) states, or a CSI interference measurement (CSIIM) resource, or both. The UE may select a first CSI measurement resource of the one or more CSI (Continued)

measurement resources for a channel measurement based on a CSI hypothesis of the set of CSI hypotheses. The UE also may select the CSIIM resource or a second CSI measurement resource for an interference measurement based on the CSI hypothesis of the set of CSI hypotheses. The UE may, as a result, transmit a report based on the channel measurement or the interference measurement, or both.

19 Claims, 12 Drawing Sheets

(56) References Cited

U.S. PATENT DOCUMENTS

| | | | |
|---|---|---|---|
| 2019/0297519 A1* | 9/2019 | Han | H04W 72/54 |
| 2019/0334601 A1 | 10/2019 | Han et al. | |
| 2020/0007299 A1* | 1/2020 | Han | H04L 5/0073 |
| 2020/0235832 A1 | 7/2020 | Lee et al. | |
| 2023/0353209 A1* | 11/2023 | Hindy | H04B 7/0628 |
| 2025/0119184 A1* | 4/2025 | Gao | H04B 7/0626 |

OTHER PUBLICATIONS

Qualcomm Incorporated: "CSI Enhancements: MTRP and FR1 FDD Reciprocity", 3GPP TSG RAN WG1 #102-e, R1-2006796, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020, 12 Pages, XP052348168, Section 2.

Supplementary European Search Report—EP20957208—Search Authority—Munich—Jun. 18, 2024.

Vivo: "Further Discussion on Multi-Beam Operation", 3GPP TSG RAN WG1 #98, R1-1908167, 3rd Generation Partnership Project, Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 17, 2019, 12 Pages, XP051764786, Sections 6, 7.

Huawei., et al., "Considerations on Two-Level Configuration of CSI Acquisition Settings", 3GPP TSG RAN WG1 Meeting #88 R1-1701682, Athens, Greece, Feb. 13-17, 2017, 5 Pages, the whole document.

International Search Report and Written Opinion—PCT/CN2020/121468—ISA/EPO—Jul. 16, 2021.

Qualcomm Incorporated: "CSI Enhancements: MTRP and FR1 FDD Reciprocity", 3GPP TSG RAN WG1 #102-e, R1-2006796, e-Meeting, Aug. 17, 2020-Aug. 28, 2020, pp. 1-11, Aug. 8, 2020, Section 2.1.

VIVO: "Further Discussion on Multi-Beam Operation", 3GPP TSG RAN WG1 #98, R1-1908167, Prague, CZ, Aug. 26, 2019-Aug. 30, 2019, 12 Pages, Aug. 17, 2019, Section 3 and 6.

* cited by examiner

Beamformed
Communications
205

210

105

210

115

210

105

105

200

One Resource For CM or IM

400

Two Resources For CM or IM

401

Communications Manager

Configuration Component

820

Resource Component

825

Report Component

830

Port Component

835

Receiver

810

Transmitter

840

815

805

800

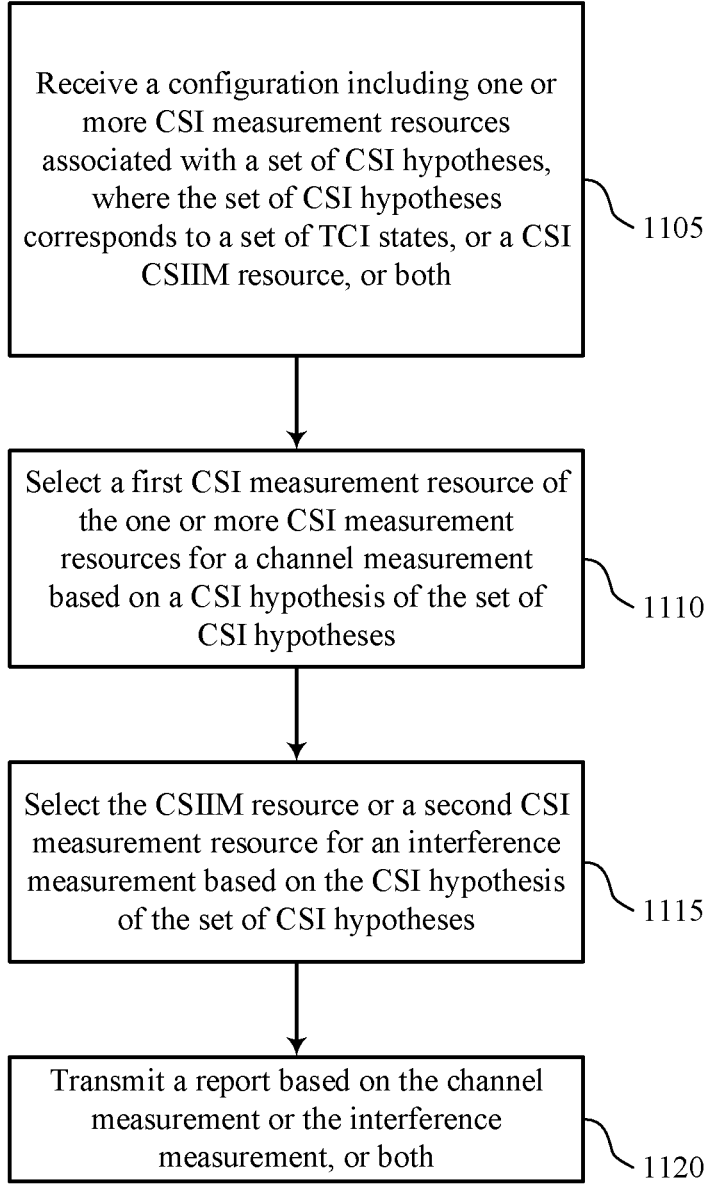

Receive a configuration including one or more CSI measurement resources associated with a set of CSI hypotheses, where the set of CSI hypotheses corresponds to a set of TCI states, or a CSI CSIIM resource, or both

1105

Select a first CSI measurement resource of the one or more CSI measurement resources for a channel measurement based on a CSI hypothesis of the set of CSI hypotheses

1110

Select the CSIIM resource or a second CSI measurement resource for an interference measurement based on the CSI hypothesis of the set of CSI hypotheses

1115

Transmit a report based on the channel measurement or the interference measurement, or both

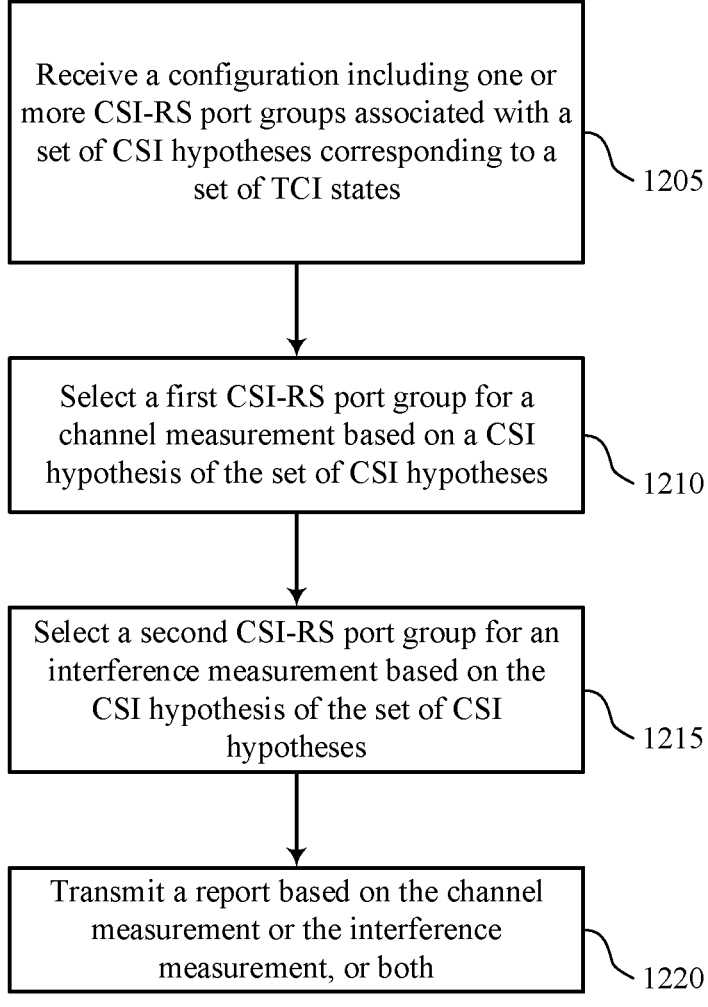

Receive a configuration including one or more CSI-RS port groups associated with a set of CSI hypotheses corresponding to a set of TCI states

1205

Select a first CSI-RS port group for a channel measurement based on a CSI hypothesis of the set of CSI hypotheses

1210

Select a second CSI-RS port group for an interference measurement based on the CSI hypothesis of the set of CSI hypotheses

1215

Transmit a report based on the channel measurement or the interference measurement, or both

RESOURCE SELECTION FOR SINGLE AND MULTIPLE TRANSMIT/RECEIVE POINTS (TRP) CHANNEL STATE INFORMATION (CSI) REPORTING

CROSS REFERENCE

The present Application is a 371 national stage filing of International PCT Application No. PCT/CN2020/121468 by KHOSHNEVISAN et al. entitled "RESOURCE SELECTION FOR SINGLE AND MULTIPLE TRANSMIT/RECEIVE POINTS (TRP) CHANNEL STATE INFORMATION (CSI) REPORTING," filed Oct. 16, 2020, which is assigned to the assignee hereof, and which is expressly incorporated by reference in its entirety herein.

TECHNICAL FIELD

This disclosure relates to wireless communications, and more specifically to resource selection for single and multiple transmit/receive points (TRP) channel state information (CSI) reporting.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources such as, time, frequency, and power. Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). A UE may be configured to support beamformed communications via directional beams. For example, the UE may be configured with multiple antenna panels to support the beamformed communications. In some implementations, to maintain reliability of the beamformed communications, the UE may be configured with a channel state information (CSI) report configuration.

SUMMARY

The systems, methods and devices of this disclosure each have several innovative aspects, no single one of which is solely responsible for the desirable attributes disclosed herein.

One innovative aspect of the subject matter described in this disclosure can be implemented in a method of wireless communication at an apparatus of a user equipment (UE) is described. In some implementations, the method can include receiving a configuration including one or more CSI measurement resources associated with a set of CSI hypotheses, where the set of CSI hypotheses corresponds to a set of transmission configuration indicator (TCI) states, or a CSI interference measurement (CSIIM) resource, or both, selecting a first CSI measurement resource of the one or more CSI measurement resources for a channel measurement based on a CSI hypothesis of the set of CSI hypotheses, selecting the CSIIM resource or a second CSI measurement resource for an interference measurement based on the CSI hypothesis of the set of CSI hypotheses, and transmitting a report based on the channel measurement or the interference measurement, or both.

Another innovative aspect of the subject matter described in this disclosure can be implemented in an apparatus for wireless communication at an apparatus of a UE is described. The apparatus can include a first interface, a second interface, and a processing system. The first interface may be configured to obtain a configuration including one or more CSI measurement resources associated with a set of CSI hypotheses, where the set of CSI hypotheses corresponds to a set of transmission configuration indicator (TCI) states, or a CSI interference measurement (CSIIM) resource, or both. The processing system may be configured to select a first CSI measurement resource of the one or more CSI measurement resources for a channel measurement based on a CSI hypothesis of the set of CSI hypotheses, select the CSIIM resource or a second CSI measurement resource for an interference measurement based on the CSI hypothesis of the set of CSI hypotheses. The second interface may be configured to output a report based on the channel measurement or the interference measurement, or both.

Another innovative aspect of the subject matter described in this disclosure can be implemented in another apparatus for wireless communication at an apparatus of a UE is described. The apparatus can include means for receiving a configuration including one or more CSI measurement resources associated with a set of CSI hypotheses, where the set of CSI hypotheses corresponds to a set of transmission configuration indicator (TCI) states, or a CSI interference measurement (CSIIM) resource, or both, selecting a first CSI measurement resource of the one or more CSI measurement resources for a channel measurement based on a CSI hypothesis of the set of CSI hypotheses, selecting the CSIIM resource or a second CSI measurement resource for an interference measurement based on the CSI hypothesis of the set of CSI hypotheses, and transmitting a report based on the channel measurement or the interference measurement, or both.

Another innovative aspect of the subject matter described in this disclosure can be implemented in a non-transitory computer-readable medium storing code for wireless communication at an apparatus of a UE is described. The code can include instructions executable by a processor to receive a configuration including one or more CSI measurement resources associated with a set of CSI hypotheses, where the set of CSI hypotheses corresponds to a set of transmission configuration indicator (TCI) states, or a CSI interference measurement (CSIIM) resource, or both, select a first CSI measurement resource of the one or more CSI measurement resources for a channel measurement based on a CSI hypothesis of the set of CSI hypotheses, select the CSIIM resource or a second CSI measurement resource for an interference measurement based on the CSI hypothesis of the set of CSI hypotheses, and transmit a report based on the channel measurement or the interference measurement, or both.

In some implementations, the method, apparatuses, and non-transitory computer-readable medium described herein, the second CSI measurement resource includes a non-zero power interference measurement resource (NZP-IMR) or the CSIIM resource.

In some implementations, method, apparatuses, and non-transitory computer-readable medium described herein, a first CSI hypothesis of the set of CSI hypotheses corresponds to a first TCI state and a second TCI state of the set of TCI states for the channel measurement, a second CSI hypothesis of the set of CSI hypotheses corresponds to the first TCI state, and a third CSI hypothesis of the set of CSI hypotheses corresponds to the second TCI state.

In some implementations, method, apparatuses, and non-transitory computer-readable medium described herein, the one or more CSI measurement resources includes the first CSI measurement resource or the second CSI measurement resource, or both.

Some implementations of the method, apparatuses, and non-transitory computer-readable medium described herein may further include operations, features, means, or instructions for selecting, based on the configuration, the first CSI measurement resource for the second CSI hypothesis corresponding to the first TCI state for the channel measurement.

Some implementations of the method, apparatuses, and non-transitory computer-readable medium described herein may further include operations, features, means, or instructions for determining a configured CSIIM resource for the second CSI hypothesis, and determining to use the CSIIM resource for the interference measurement.

Some implementations of the method, apparatuses, and non-transitory computer-readable medium described herein may further include operations, features, means, or instructions for selecting, based on a dynamic point selection of the second TCI state, the second CSI measurement resource as an NZP-IMR for the second CSI hypothesis.

In some implementations, method, apparatuses, and non-transitory computer-readable medium described herein, each CSI-RS port of a non-zero power CSI reference signal (NZP CSI-RS) associated with the second CSI measurement resource includes a single interference layer.

Some implementations of the method, apparatuses, and non-transitory computer-readable medium described herein may further include operations, features, means, or instructions for determining a first power control offset ratio associated with a CSI-RS port for the interference measurement based on selecting the second CSI measurement resource as the NZP-IMR, and determining a second power control offset ratio associated with the CSI-RS port based on selecting the second CSI measurement resource for the channel measurement, where the first power control offset ratio may be different from the second power control offset ratio.

Some implementations of the method, apparatuses, and non-transitory computer-readable medium described herein may further include operations, features, means, or instructions for selecting, based on a dynamic point selection of the second TCI state, the second CSI measurement resource as the CSIIM resource for the second CSI hypothesis, and measuring an energy ratio associated with the second CSI measurement resource based on using the second CSI measurement resource as the CSIIM resource for the second CSI hypothesis.

Some implementations of the method, apparatuses, and non-transitory computer-readable medium described herein may further include operations, features, means, or instructions for selecting, based on a dynamic point selection of the second TCI state, the second CSI measurement resource as an NZP-IMR for the second CSI hypothesis, estimating an energy ratio associated with each CSI-RS port based on using the second CSI measurement resource as the NZP-IMR for the second CSI hypothesis, and aggregating the energy ratio associated with each CSI-RS port.

Some implementations of the method, apparatuses, and non-transitory computer-readable medium described herein may further include operations, features, means, or instructions for determining, based on a dynamic point selection of the second TCI state, that the second CSI measurement resource associated with a set of non-zero power CSI reference signal (NZP CSI-RS) ports corresponds to a set of interference layers.

In some implementations, method, apparatuses, and non-transitory computer-readable medium described herein, the set of interference layers may be configured for the UE.

In some implementations, method, apparatuses, and non-transitory computer-readable medium described herein, a subset of NZP CSI-RS ports of the set of NZP CSI-RS ports correspond to a single interference layer of the set of interference layers.

In some implementations, method, apparatuses, and non-transitory computer-readable medium described herein, a precoder to transform the set of NZP CSI-RS ports to the set of interference layers may be preconfigured.

Some implementations of the method, apparatuses, and non-transitory computer-readable medium described herein may further include operations, features, means, or instructions for selecting a precoding matrix to transform the set of NZP CSI-RS ports to the set of interference layers, transforming, in each band or subband, the set of NZP CSI-RS ports to the set of interference layers based on a random precoding operation, and determining an average of the transformed set of NZP CSI-RS ports to the set of interference layers.

In some implementations, method, apparatuses, and non-transitory computer-readable medium described herein, the precoding matrix includes a wideband precoding matrix and a subband precoding matrix per subband, the wideband precoding matrix may be configured for the UE and the subband precoding matrix may be randomly selected by the UE in each subband.

Some implementations of the method, apparatuses, and non-transitory computer-readable medium described herein may further include operations, features, means, or instructions for selecting a precoding matrix to transform the set of NZP CSI-RS ports to the set of interference layers, and transforming, in each radio frequency spectrum band or subband, the set of NZP CSI-RS ports to the set of interference layers based on a partial random precoding operation including a first precoding matrix or a second precoding matrix, or a combination thereof.

Some implementations of the method, apparatuses, and non-transitory computer-readable medium described herein may further include operations, features, means, or instructions for determining a dynamic point blanking of the second TCI state, and determining to refrain from using the second CSI measurement resource for the interference measurement based on the dynamic point blanking of the second TCI state.

Some implementations of the method, apparatuses, and non-transitory computer-readable medium described herein may further include operations, features, means, or instructions for determining a dynamic point blanking of the second TCI state, and estimating an interference associated with a set of non-zero power CSI reference signal (NZP CSI-RS) ports associated with the second CSI measurement resource.

Some implementations of the method, apparatuses, and non-transitory computer-readable medium described herein may further include operations, features, means, or instructions for selecting, based on the configuration, the second CSI measurement resource for the second CSI hypothesis or the third CSI hypothesis, or both, corresponding to the second TCI state for the channel measurement, where the UE determines that the CSIIM resource may be an additional interference resource based on the configuration.

Some implementations of the method, apparatuses, and non-transitory computer-readable medium described herein may further include operations, features, means, or instructions for determining a configured CSIIM resource for the third CSI hypothesis, and determining to use the CSIIM resource for the interference measurement.

Some implementations of the method, apparatuses, and non-transitory computer-readable medium described herein may further include operations, features, means, or instructions for selecting, based on a dynamic point selection of the first TCI state, the second CSI measurement resource as an NZP-IMR for the third CSI hypothesis.

In some implementations, method, apparatuses, and non-transitory computer-readable medium described herein, each CSI-RS port of a non-zero power CSI reference signal (NZP CSI-RS) associated with the second CSI measurement resource includes a single interference layer.

Some implementations of the method, apparatuses, and non-transitory computer-readable medium described herein may further include operations, features, means, or instructions for determining a first power control offset ratio associated with a CSI-RS port for the interference measurement based on selecting the second CSI measurement resource as the NZP-IMR, and determining a second power control offset ratio associated with the CSI-RS port for the channel measurement based on selecting the second CSI measurement resource, where the first power control offset ratio may be different from the second power control offset ratio.

Some implementations of the method, apparatuses, and non-transitory computer-readable medium described herein may further include operations, features, means, or instructions for selecting, based on a dynamic point selection of the first TCI state, the second CSI measurement resource as the CSIIM resource for the third CSI hypothesis, and measuring an energy ratio associated with the second CSI measurement resource based on using the second CSI measurement resource as the CSIIM resource for the third CSI hypothesis.

Some implementations of the method, apparatuses, and non-transitory computer-readable medium described herein may further include operations, features, means, or instructions for selecting, based on a dynamic point selection of the first TCI state, the second CSI measurement resource as an NZP-IMR for the third CSI hypothesis, estimating an energy ratio associated with each CSI-RS port based on using the second CSI measurement resource as the NZP-IMR for the third CSI hypothesis, and aggregating the energy ratio associated with each CSI-RS port.

Some implementations of the method, apparatuses, and non-transitory computer-readable medium described herein may further include operations, features, means, or instructions for determining, based on a dynamic point selection of the first TCI state, that the second CSI measurement resource associated with a set of non-zero power CSI reference signal (NZP CSI-RS) ports corresponds to a set of interference layers.

In some implementations, method, apparatuses, and non-transitory computer-readable medium described herein, the set of interference layers may be configured for the UE.

In some implementations, method, apparatuses, and non-transitory computer-readable medium described herein, a subset of NZP CSI-RS ports of the set of NZP CSI-RS ports correspond to a single interference layer of the set of interference layers.

In some implementations, method, apparatuses, and non-transitory computer-readable medium described herein, a precoder to transform the set of NZP CSI-RS ports to the set of interference layers may be preconfigured.

Some implementations of the method, apparatuses, and non-transitory computer-readable medium described herein may further include operations, features, means, or instructions for selecting a precoding matrix to transform the set of NZP CSI-RS ports to the set of interference layers, transforming, in each radio frequency spectrum band or subband, the set of NZP CSI-RS ports to the set of interference layers based on a random precoding operation, and determining an average of the set of NZP CSI-RS ports to the set of interference layers based on the transforming.

In some implementations, method, apparatuses, and non-transitory computer-readable medium described herein, the precoding matrix includes a wideband precoding matrix, the wideband precoding matrix may be configured for the UE.

Some implementations of the method, apparatuses, and non-transitory computer-readable medium described herein may further include operations, features, means, or instructions for selecting a precoding matrix to transform the set of NZP CSI-RS ports to the set of interference layers, and transforming, in each band or subband, the set of NZP CSI-RS ports to the set of interference layers based on a partial random precoding operation including a first precoding matrix or a second precoding matrix, or a combination thereof.

In some implementations, method, apparatuses, and non-transitory computer-readable medium described herein, the precoding matrix includes a wideband precoding matrix and a subband precoding matrix per subband, the wideband precoding matrix may be configured for the UE and the subband precoding matrix may be randomly selected by the UE in each subband.

In some implementations, method, apparatuses, and non-transitory computer-readable medium described herein, the first CSI measurement resource and the second CSI measurement resource correspond to a same quasi-colocation parameter.

Some implementations of the method, apparatuses, and non-transitory computer-readable medium described herein may further include operations, features, means, or instructions for determining that the second CSI measurement resource may be configured with a second quasi-colocation parameter, determining that the second CSI measurement resource may be used for the interference measurement, and refraining from using the second quasi-colocation parameter for the second CSI measurement resource based on that the second CSI measurement resource may be used for the interference measurement.

Some implementations of the method, apparatuses, and non-transitory computer-readable medium described herein may further include operations, features, means, or instructions for selecting a first quasi-colocation parameter associated with the first CSI measurement resource for the second CSI measurement resource.

Some implementations of the method, apparatuses, and non-transitory computer-readable medium described herein may further include operations, features, means, or instructions for receiving a radio resource control message, a medium access control-control element message, or a downlink control information message including the configuration, the configuration corresponding to a dynamic point selection operation or a dynamic point blanking operation, or a combination thereof.

Some implementations of the method, apparatuses, and non-transitory computer-readable medium described herein may further include operations, features, means, or instructions for selecting the CSIIM resource associated with a first CSI hypothesis for the interference measurement for a second CSI hypothesis, where the UE determines that the CSIIM resource may be an additional interference resource based on the configuration.

Another innovative aspect of the subject matter described in this disclosure can be implemented in a method of wireless communication at an apparatus of a base station is described. In some implementations, the method may include receiving a configuration including one or more CSI reference signal (CSI-RS) port groups associated with a set of CSI hypotheses corresponding to a set of transmission configuration indicator (TCI) states, selecting a first CSI-RS port group for a channel measurement based on a CSI hypothesis of the set of CSI hypotheses, selecting a second CSI-RS port group for an interference measurement based on the CSI hypothesis of the set of CSI hypotheses, and transmitting a report based on the channel measurement or the interference measurement, or both.

Another innovative aspect of the subject matter described in this disclosure can be implemented in an apparatus for wireless communication at an apparatus of a base station is described. The apparatus can include a first interface, a second interface, and a processing system. The first interface may be configured to obtain a configuration including one or more CSI reference signal (CSI-RS) port groups associated with a set of CSI hypotheses corresponding to a set of transmission configuration indicator (TCI) states. The processing system may be configured to select a first CSI-RS port group for a channel measurement based on a CSI hypothesis of the set of CSI hypotheses, and select a second CSI-RS port group for an interference measurement based on the CSI hypothesis of the set of CSI hypotheses. The second interface may be configured to transmit a report based on the channel measurement or the interference measurement, or both.

Another innovative aspect of the subject matter described in this disclosure can be implemented in an apparatus for wireless communication at an apparatus of a UE is described. The apparatus may include means for receiving a configuration including one or more CSI reference signal (CSI-RS) port groups associated with a set of CSI hypotheses corresponding to a set of transmission configuration indicator (TCI) states, selecting a first CSI-RS port group for a channel measurement based on a CSI hypothesis of the set of CSI hypotheses, selecting a second CSI-RS port group for an interference measurement based on the CSI hypothesis of the set of CSI hypotheses, and transmitting a report based on the channel measurement or the interference measurement, or both.

Another innovative aspect of the subject matter described in this disclosure can be implemented in a non-transitory computer-readable medium storing code for wireless communication at an apparatus of a base station is described. The code can include instructions executable by a processor to receive a configuration including one or more CSI reference signal (CSI-RS) port groups associated with a set of CSI hypotheses corresponding to a set of transmission configuration indicator (TCI) states, select a first CSI-RS port group for a channel measurement based on a CSI hypothesis of the set of CSI hypotheses, select a second CSI-RS port group for an interference measurement based on the CSI hypothesis of the set of CSI hypotheses, and transmit a report based on the channel measurement or the interference measurement, or both.

In some implementations, method, apparatuses, and non-transitory computer-readable medium described herein, a first CSI hypothesis of the set of CSI hypotheses corresponds to a first TCI state and a second TCI state of the set of TCI states for the channel measurement, a second CSI hypothesis of the set of CSI hypotheses corresponds to the first TCI state, and a third CSI hypothesis of the set of CSI hypotheses corresponds to the second TCI state.

In some implementations, method, apparatuses, and non-transitory computer-readable medium described herein, the one or more CSI-RS port groups includes the first CSI-RS port group or the second CSI-RS port group, or both.

Some implementations of the method, apparatuses, and non-transitory computer-readable medium described herein may further include operations, features, means, or instructions for selecting, based on the configuration, the first CSI-RS port group for the second CSI hypothesis corresponding to the first TCI state for the channel measurement.

Some implementations of the method, apparatuses, and non-transitory computer-readable medium described herein may further include operations, features, means, or instructions for determining a configured CSIIM resource for the second CSI hypothesis, and determining to use the CSIIM resource for the interference measurement.

Some implementations of the method, apparatuses, and non-transitory computer-readable medium described herein may further include operations, features, means, or instructions for selecting, based on a dynamic point selection of the second TCI state, the second CSI-RS port group as an NZP-IMR for the second CSI hypothesis.

In some implementations, method, apparatuses, and non-transitory computer-readable medium described herein, a non-zero power CSI reference signal (NZP CSI-RS) associated with the second CSI-RS port group includes a single interference layer.

Some implementations of the method, apparatuses, and non-transitory computer-readable medium described herein may further include operations, features, means, or instructions for determining a first power control offset ratio for the interference measurement based on selecting the second CSI-RS port group as the NZP-IMR, and determining a second power control offset ratio for the channel measurement based on selecting the second CSI-RS port group, where the first power control offset ratio may be different from the second power control offset ratio.

In some implementations, method, apparatuses, and non-transitory computer-readable medium described herein, the first CSI-RS port group and the second CSI-RS port group correspond to a same quasi-colocation parameter.

Some implementations of the method, apparatuses, and non-transitory computer-readable medium described herein may further include operations, features, means, or instructions for selecting, based on a dynamic point selection of the second TCI state, the second CSI-RS port group as a CSIIM resource for the second CSI hypothesis, and measuring an energy ratio associated with the second CSI-RS port group based on using the second CSI-RS port group as the CSIIM resource for the second CSI hypothesis.

Some implementations of the method, apparatuses, and non-transitory computer-readable medium described herein may further include operations, features, means, or instructions for selecting, based on a dynamic point selection of the second TCI state, the second CSI-RS port group as an NZP-IMR for the second CSI hypothesis, estimating an energy ratio associated with the one or more CSI-RS port groups based on using the second CSI-RS port group as the NZP-IMR for the second CSI hypothesis, and aggregating the energy ratio associated with the one or more CSI-RS port groups.

Some implementations of the method, apparatuses, and non-transitory computer-readable medium described herein may further include operations, features, means, or instructions for determining, based on a dynamic point selection of the second TCI state, that the second CSI-RS port group associated with a set of non-zero power CSI reference signal (NZP CSI-RS) ports corresponds to a set of interference layers.

In some implementations, method, apparatuses, and non-transitory computer-readable medium described herein, the set of interference layers may be configured for the UE.

In some implementations, method, apparatuses, and non-transitory computer-readable medium described herein, a subset of NZP CSI-RS ports of the set of NZP CSI-RS ports correspond to a single interference layer of the set of interference layers.

In some implementations, method, apparatuses, and non-transitory computer-readable medium described herein, a precoder to transform the set of NZP CSI-RS ports to the set of interference layers may be preconfigured.

Some implementations of the method, apparatuses, and non-transitory computer-readable medium described herein may further include operations, features, means, or instructions for selecting a precoding matrix to transform the set of NZP CSI-RS ports to the set of interference layers, transforming, in each radio frequency spectrum band or subband, the set of NZP CSI-RS ports to the set of interference layers based on a random precoding operation, and determining an average of the transformed set of NZP CSI-RS ports to the set of interference layers.

In some implementations, method, apparatuses, and non-transitory computer-readable medium described herein, the precoding matrix includes a wideband precoding matrix and a subband precoding matrix per subband, the wideband precoding matrix may be configured for the UE and the subband precoding matrix may be randomly selected by the UE in each subband.

Some implementations of the method, apparatuses, and non-transitory computer-readable medium described herein may further include operations, features, means, or instructions for selecting a precoding matrix to transform the set of NZP CSI-RS ports to the set of interference layers, and transforming, in each radio frequency spectrum band or subband, the set of NZP CSI-RS ports to the set of interference layers based on a partial random precoding operation including a first precoding matrix or a second precoding matrix, or a combination thereof.

Some implementations of the method, apparatuses, and non-transitory computer-readable medium described herein may further include operations, features, means, or instructions for determining a dynamic point blanking of the second TCI state, and determining to refrain from using the second CSI-RS port group for the interference measurement based on the dynamic point blanking of the second TCI state.

Some implementations of the method, apparatuses, and non-transitory computer-readable medium described herein may further include operations, features, means, or instructions for determining a dynamic point blanking of the second TCI state, and estimating an interference associated with a set of non-zero power CSI reference signal (NZP CSI-RS) ports associated with the second CSI-RS port group.

Some implementations of the method, apparatuses, and non-transitory computer-readable medium described herein may further include operations, features, means, or instructions for selecting the CSIIM resource associated with the first CSI hypothesis for the interference measurement for the second CSI hypothesis, where the UE determines that the CSIIM resource may be an additional interference resource based on the configuration.

Some implementations of the method, apparatuses, and non-transitory computer-readable medium described herein may further include operations, features, means, or instructions for selecting, based on the configuration, the second CSI-RS port group for the third CSI hypothesis corresponding to the second TCI state for the channel measurement.

Some implementations of the method, apparatuses, and non-transitory computer-readable medium described herein may further include operations, features, means, or instructions for determining a configured CSIIM resource for the third CSI hypothesis, and determining to use the CSIIM resource for the interference measurement.

Some implementations of the method, apparatuses, and non-transitory computer-readable medium described herein may further include operations, features, means, or instructions for selecting, based on a dynamic point selection of the first TCI state, the second CSI-RS port group as an NZP-IMR for the third CSI hypothesis.

In some implementations, method, apparatuses, and non-transitory computer-readable medium described herein, each CSI-RS port of a non-zero power CSI reference signal (NZP CSI-RS) associated with the second CSI-RS port group includes a single interference layer.

Some implementations of the method, apparatuses, and non-transitory computer-readable medium described herein may further include operations, features, means, or instructions for determining a first power control offset ratio for the interference measurement based on selecting the second CSI-RS port group as the NZP-IMR, and determining a second power control offset ratio for the channel measurement based on selecting the second CSI-RS port group, where the first power control offset ratio may be different from the second power control offset ratio.

Some implementations of the method, apparatuses, and non-transitory computer-readable medium described herein may further include operations, features, means, or instructions for selecting, based on a dynamic point selection of the first TCI state, the second CSI-RS port group as a CSIIM resource for the third CSI hypothesis, and measuring an energy ratio associated with the second CSI-RS port group based on using the second CSI-RS port group as the CSIIM resource for the third CSI hypothesis.

Some implementations of the method, apparatuses, and non-transitory computer-readable medium described herein may further include operations, features, means, or instructions for selecting, based on a dynamic point selection of the first TCI state, the second CSI-RS port group as an NZP-IMR for the third CSI hypothesis, estimating an energy ratio based on using the second CSI-RS port group as the NZP-IMR for the third CSI hypothesis, and aggregating the energy ratio.

Some implementations of the method, apparatuses, and non-transitory computer-readable medium described herein may further include operations, features, means, or instructions for determining, based on a dynamic point selection of the first TCI state, that the second CSI-RS port group associated with a set of non-zero power CSI reference signal (NZP CSI-RS) ports corresponds to a set of interference layers.

In some implementations, method, apparatuses, and non-transitory computer-readable medium described herein, a subset of NZP CSI-RS ports of the set of NZP CSI-RS ports correspond to a single interference layer of the set of interference layers.

In some implementations, method, apparatuses, and non-transitory computer-readable medium described herein, a precoder to transform the set of NZP CSI-RS ports to the set of interference layers may be preconfigured.

Some implementations of the method, apparatuses, and non-transitory computer-readable medium described herein may further include operations, features, means, or instructions for selecting a precoding matrix to transform the set of NZP CSI-RS ports to the set of interference layers, transforming, in each radio frequency spectrum band or subband, the set of NZP CSI-RS ports to the set of interference layers based on a random precoding operation, and determining an average of the set of NZP CSI-RS ports to the set of interference layers based on the transforming.

In some implementations, method, apparatuses, and non-transitory computer-readable medium described herein, the precoding matrix includes a wideband precoding matrix and a subband precoding matrix per subband, the wideband precoding matrix may be configured for the UE and the subband precoding matrix may be randomly selected by the UE in each subband.

Some implementations of the method, apparatuses, and non-transitory computer-readable medium described herein may further include operations, features, means, or instructions for selecting a precoding matrix to transform the set of NZP CSI-RS ports to the set of interference layers, and transforming, in each radio frequency spectrum band or subband, the set of NZP CSI-RS ports to the set of inter-ference layers based on a partial random precoding opera-tion including a first precoding matrix or a second precoding matrix, or a combination thereof.

Some implementations of the method, apparatuses, and non-transitory computer-readable medium described herein may further include operations, features, means, or instruc-tions for determining that the second CSI-RS port group may be configured with a second quasi-colocation param-eter, determining that the second CSI-RS port group may be used for the interference measurement, refraining from using the second quasi-colocation parameter for the second CSI-RS port group based on that the second CSI-RS port group may be used for the interference measurement, and selecting a first quasi-colocation parameter associated with the first CSI-RS port group for the second CSI-RS port group.

Some implementations of the method, apparatuses, and non-transitory computer-readable medium described herein may further include operations, features, means, or instruc-tions for receiving a radio resource control message, a medium access control-control element message, or a down-link control information message including the configura-tion, the configuration corresponding to a dynamic point selection operation or a dynamic point blanking operation, or a combination thereof.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIGS. 11 and 12 show flowcharts illustrating methods that support resource selection for single and multiple TRP CSI reporting.

Like reference numbers and designations in the various drawings indicate like elements.

DETAILED DESCRIPTION

Figure 1:
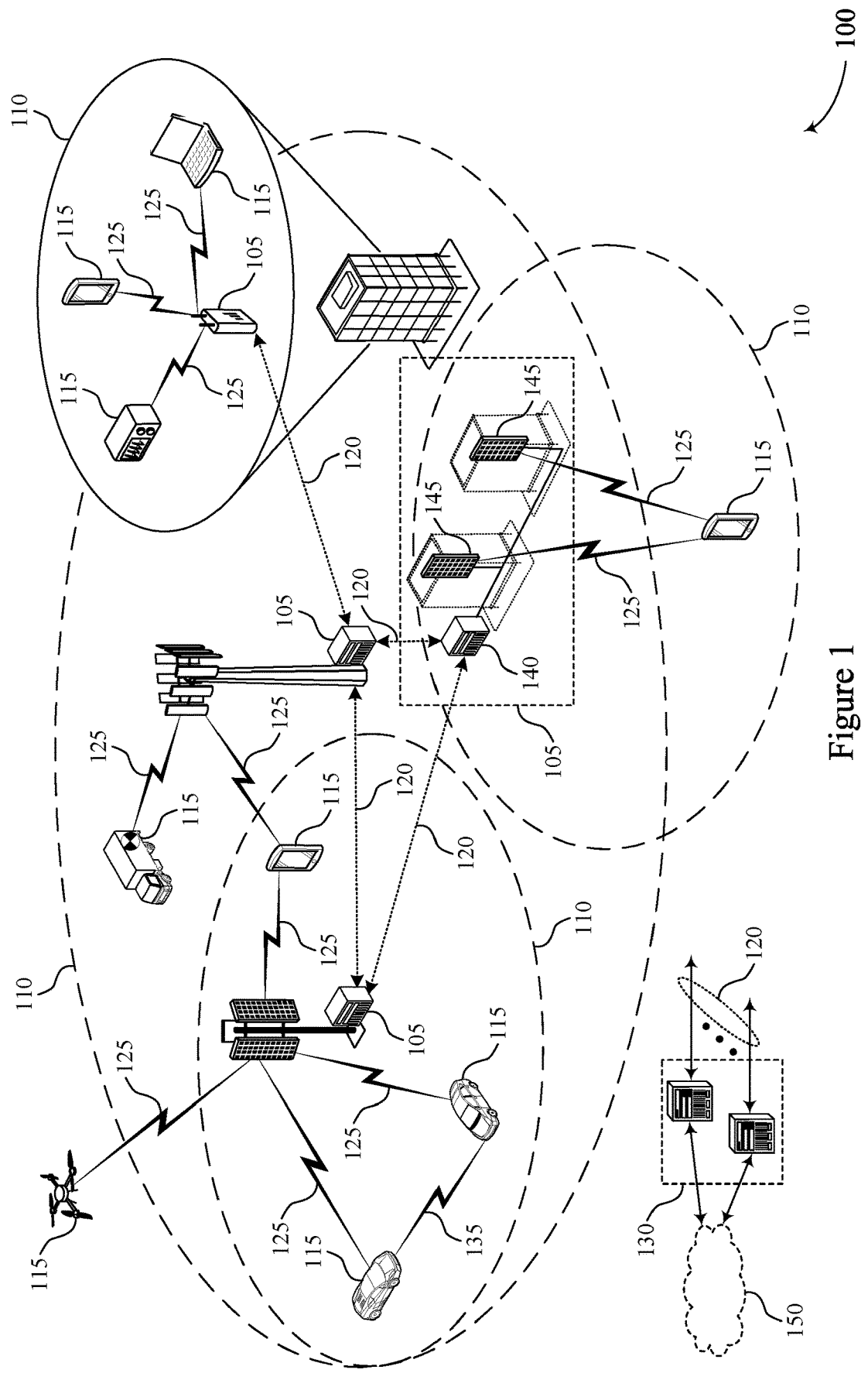
FIGS. 1 and 2 illustrate examples of wireless communi-cation systems for wireless communications that support resource selection for single and multiple transmit/receive points (TRP) channel state information (CSI) reporting.

The following description is directed to certain imple-mentations for the purposes of describing the innovative aspects of this disclosure. However, a person having ordi-nary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Blu-etooth® standard, code division multiple access (CDMA), frequency division multiple access (FDMA), time division multiple access (TDMA), Global System for Mobile com-munications (GSM), GSM/General Packet Radio Service (GPRS), Enhanced Data GSM Environment (EDGE), Ter-restrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system or utilizing 3G, 4G, or 5G further implementations thereof, technology.

A device may be configured with a channel state infor-mation (CSI) report configuration including various resource settings that the device may select and use to generate a CSI report based on channel and interference measurements performed in accordance with the selected resource setting. Each resource setting may have at least one active resource set. A resource within a resource set may be referred to as a CSI hypothesis. The device may, in some implementations, be exposed to one or more multi-transmit/ receive points (mTRPs) such as, base stations, and the like, which may impact the reliability of wireless communications, for example, downlink reception and uplink transmission at the device. The device may be configured to provide an mTRP CSI report, which corresponds to a CSI report associated with more than one transmission configuration indicator (TCI) state. In some implementations, the device may be configured to use a single resource, which may relate to antenna port groups, where each antenna port group relates to one TCI state. For example, some antenna ports of the resource might correspond to one directional beam, and other ports of the resource may correspond to another directional beam. In some other implementations, two resources may be linked and an mTRP CSI hypothesis may correspond to the pair of resources.

Various aspects of the present disclosure relate to reducing overhead signaling and resource usage associated with CSI reporting. For example, the device may be configured to use a channel state information (CSI) measurement resource (CMR) for an mTRP CSI as a non-zero power (NZP) interference measurement resource (NZP-IMR), or a channel state information interference measurement (CSIIM) resource for a single TRP (sTRP) CSI, to reduce messaging overhead, as well as resource overhead for the device. The device may be configured with a pair of CMRs used for a first CSI hypothesis corresponding to a first directional beam such as, a first TCI state, and a second directional beam, such as a second TCI state, for channel measurement and a CSIIM resource for interference measurement. The device may additionally be configured with a second CSI hypothesis corresponding to the first TCI state exclusively or a third CSI hypotheses corresponding to the second TCI state exclusively. In some examples, the device may select a CMR for a channel measurement based on a CSI hypothesis and select a CSIIM resource or another CMR for an interference measurement based on the CSI hypothesis. The other CMR may be an NZP-IMR or the CSIIM resource. In some other examples, the device may select an antenna port group for a channel measurement based on a CSI hypothesis and select a CSIIM resource or another antenna port group for an interference measurement based on the CSI hypothesis.

Particular implementations of the subject matter described in this disclosure can be implemented to realize one or more of the following potential advantages. The techniques employed by the device may provide benefits and enhancements to the operation of the device. For example, operations performed by the device may provide higher reliability wireless communications (for example, downlink reception, uplink transmission) by providing improvements to CSI reporting based on channel and interference measurement. In some implementations, configuring the device to support techniques for using a CMR for mTRP CSI as an NZP-IMR or CSIIM resource for a sTRP CSI, may support improvements to power consumption by reducing overhead signaling and resource usage associated with channel and interference measurement. In some other implementations, configuring the device to support techniques for using a CMR for mTRP CSI as an NZP-IMR or CSIIM resource for a sTRP CSI may provide spectral efficiency, among other benefits.

FIG. 1 illustrates an example of a wireless communications system 100 that supports resource selection for single and multiple TRP CSI reporting. The wireless communications system 100 may include one or more base stations 105, one or more UEs 115, and a core network 130. In some examples, the wireless communications system 100 may be an LTE network, an LTE-A network, an LTE-A Pro network, or a NR network. In some examples, the wireless communications system 100 may support enhanced broadband communications, ultra-reliable such as, mission critical communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (such as, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (such as, via an S1, N2, N3, or another interface). The base stations 105 may communicate with one another over the backhaul links 120 (such as, via an X2, Xn, or other interface) either directly (such as, directly between base stations 105), or indirectly (such as, via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (such as, a bandwidth part (BWP)) that is operated according to one or more physical layer channels for a given radio access technology (such as, LTE, LTE-A, LTE-A Pro, NR). Each physical layer channel may carry acquisition signaling (such as, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier also may have acquisition signaling or control signaling that coordinates operations for other carriers. A carrier may be associated with a frequency channel (such as, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (such as, of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (such as, in an FDD mode) or may be configured to carry downlink and uplink communications (such as, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (such as, 1.4, 3, 5, 10, 15, 20, 40, or 80 megahertz (MHz)). Devices of the wireless communications system 100 (such as, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (such as, a sub-band, a BWP) or all of a carrier bandwidth.

Signal waveforms transmitted over a carrier may be made up of multiple subcarriers (such as, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (such as, a duration of one modulation symbol) and one subcarrier, where the symbol period and subcarrier spacing are inversely related. The number of bits carried by each resource element may depend on the modulation scheme (such as, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (such as, spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as, 10 milliseconds (ms)). Each radio frame may be identified by a system frame number (SFN) (such as, ranging from 0 to 1023).

Each frame may include multiple consecutively numbered subframes or slots, and each subframe or slot may have the same duration. In some examples, a frame may be divided (such as, in the time domain) into subframes, and each subframe may be further divided into a number of slots. Alternatively, each frame may include a variable number of slots, and the number of slots may depend on subcarrier spacing. Each slot may include a number of symbol periods (such as, depending on the length of the cyclic prefix prepended to each symbol period). In some wireless communications systems 100, a slot may further be divided into multiple mini-slots containing one or more symbols. Excluding the cyclic prefix, each symbol period may contain one or more (such as, $N_f$) sampling periods. The duration of a symbol period may depend on the subcarrier spacing or frequency band of operation. A subframe, a slot, a mini-slot, or a symbol may be the smallest scheduling unit (such as, in the time domain) of the wireless communications system 100 and may be referred to as a transmission time interval (TTI). In some examples, the TTI duration (such as, the number of symbol periods in a TTI) may be variable. Additionally, or alternatively, the smallest scheduling unit of the wireless communications system 100 may be dynamically selected (such as, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (such as, a control resource set (CORESET)) for a physical control channel may be defined by a number of symbol periods and may extend across the system bandwidth or a subset of the system bandwidth of the carrier. One or more control regions (such as, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (such as, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (such as, over a carrier) and may be associated with an identifier for distinguishing neighboring cells (such as, a physical cell identifier (PCID), a virtual cell identifier (VCID), or others). In some examples, a cell also may refer to a geographic coverage area 110 or a portion of a geographic coverage area 110 (such as, a sector) over which the logical communication entity operates. Such cells may range from smaller areas (such as, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (such as, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (such as, licensed, unlicensed) frequency bands as macro cells. Small cells may provide unrestricted access to the UEs 115 with service subscriptions with the network provider or may provide restricted access to the UEs 115 having an association with the small cell (such as, the UEs 115 in a closed subscriber group (CSG), the UEs 115 associated with users in a home or office). A base station 105 may support one or multiple cells and also may support communications over the one or more cells using one or multiple component carriers. In some examples, a carrier may support multiple cells, and different cells may be configured according to different protocol types (such as, MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In some other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (such as, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (such as, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (such as, according to narrowband communications), or a combination of these techniques. For example, some UEs 115 may be configured for operation using a narrowband protocol type that is associated with a defined portion or range (such as, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (such as, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 also may be able to communicate directly with other UEs 115 over a device-to-device (D2D) communication link 135 (such as, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other implementations, D2D communications are carried out between the UEs 115 without the involvement of a base station 105.

The D2D communication link 135 may be an example of a communication channel, such as a sidelink communication channel, between vehicles (such as, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (such as, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as, a mobility management entity (MME), an access and mobility management function (AMF)) and at least one user plane entity that routes packets or interconnects to external networks (such as, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (such as, radio heads and ANCs) or consolidated into a single network device (such as, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (such as, less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (such as, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (such as, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (such as, the same codeword) or different data streams (such as, different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (such as, a base station 105, a UE 115) to shape or steer an antenna beam (such as, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (such as, antenna panels) to conduct beamforming operations for directional communications with a UE 115. Some signals (such as, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (such as, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (such as, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (such as, by a base station 105 or a UE 115) may be performed using multiple beam directions, and the device may use a combination of digital precoding or radio frequency beamforming to generate a combined beam for transmission (such as, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (such as, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (such as, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (such as, for identifying a beam direction for subsequent transmission or reception by the UE 115) or for transmitting a signal in a single direction (such as, for transmitting data to a receiving device).

A receiving device (such as, a UE 115) may try multiple receive configurations (such as, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (such as, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (such as, when receiving a data signal). The single receive configuration may be aligned in a beam direction determined based on listening according to different receive configuration directions (such as, a beam direction determined to have a highest signal strength, highest signal-to-noise ratio (SNR), or otherwise acceptable signal quality based on listening according to multiple beam directions).

A UE 115 may be configured with a CSI report configuration including one or more resource settings that the UE 115 may select and use to generate a CSI report based on channel and interference measurements performed in accordance with the selected resource setting. Each resource setting may have at least one active resource set. A resource within a resource set may be referred to as a CSI hypothesis. The UE 115 may, in some implementations, be exposed to multiple TRPs (mTRPs) such as, two or more base stations 105, and the like, which may impact the reliability of wireless communications, for example, downlink reception and uplink transmission at the UE 115.

The UE 115 may be configured to provide an mTRP CSI report, which corresponds to a CSI report associated with more than one TCI state. In some implementations, the UE 115 may be configured to use a single resource, which may relate to antenna port groups. Each antenna port group relates to one TCI state. For example, some antenna ports of the resource might correspond to one directional beam, and other ports of the resource may correspond to another directional beam. In some other implementations, two resources may be linked and an mTRP CSI hypothesis may correspond to the pair of resources.

The UE 115 may, in some implementations, be configured to decrease overhead signaling and resource usage related to CSI reporting. For example, the UE 115 may be configured to use a CMR for mTRP CSI as an NZP-IMR or CSIIM resource for a sTRP CSI. The UE 115 may be configured with a pair of CMRs used for a first CSI hypothesis corresponding to a first directional beam such as, a first TCI state, and a second directional beam, such as a second TCI state for channel measurement and a CSIIM resource for interference measurement. In some implementations, the UE 115 may be configured with a second CSI hypothesis corresponding to the first TCI state exclusively. In some other implementations, the UE 115 may be configured with a third CSI hypotheses corresponding to the second TCI state exclusively.

The UE 115 may be configured to select a CMR for a channel measurement based on a CSI hypothesis. Additionally, or alternatively, the UE 115 may be configured to select a CSIIM resource or another CMR for an interference measurement based on the CSI hypothesis. The other CMR may be an NZP-IMR or the CSIIM resource. In some other examples, the UE 115 may additionally, or alternatively, select an antenna port group for a channel measurement based on a CSI hypothesis and select a CSIIM resource or another antenna port group for an interference measurement based on the CSI hypothesis.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (such as, using a cyclic redundancy check (CRC)), forward error correction (FEC), and retransmission (such as, automatic repeat request (ARQ)). HARQ may improve throughput at the MAC layer in poor radio conditions (such as, low signal-to-noise conditions). In some examples, a device may support same-slot HARQ feedback, where the device may provide HARQ feedback in a specific slot for data received in a previous symbol in the slot. In other implementations, the device may provide HARQ feedback in a subsequent slot, or according to some other time interval.

Figure 2:
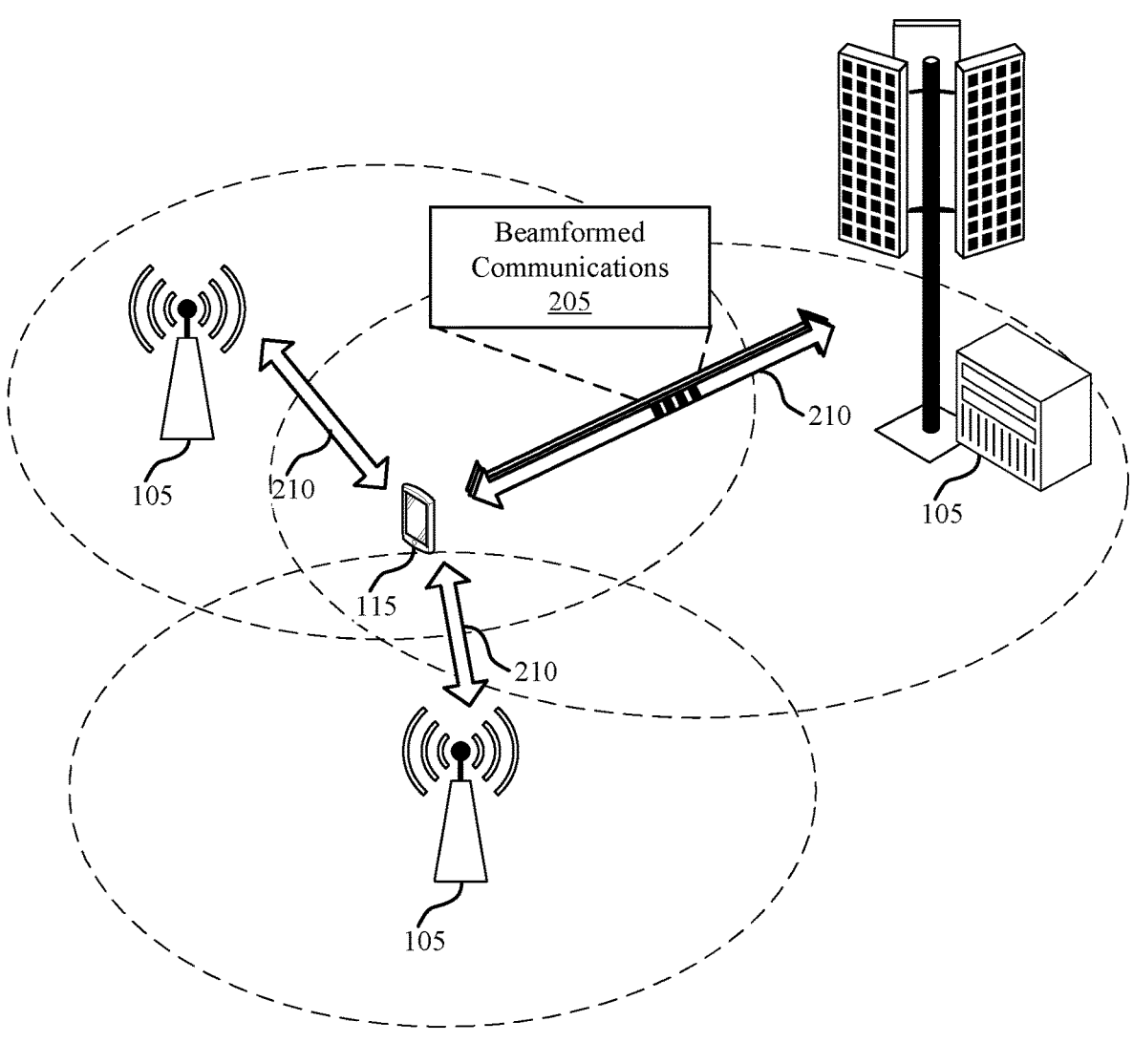

FIG. 2 illustrates an example of a wireless communications system 200 that supports resource selection for single and multiple TRP CSI reporting. The wireless communications system 200 may implement aspects of the wireless communications system 100. For example, the wireless communications system 200 may include one or more base stations 105 and a UE 115 as described herein. The wireless communications system 200 may support multiple radio access technologies including 4G systems such as LTE systems, LTE-A systems, or LTE-A Pro systems, and 5G systems, which may be referred to as NR systems.

The base station 105 and the UE 115 may be configured with multiple antennas, which may be used to employ techniques such as transmit diversity, receive diversity, multiple-input multiple-output communications, or beamforming, or any combination thereof. The antennas of the base station 105 and the UE 115 may be located within one or more antenna arrays or antenna panels, which may support multiple-input multiple-output operations or transmit or receive beamforming. For example, the base station 105 antennas or antenna arrays may be co-located at an antenna assembly, such as an antenna tower. In some examples, antennas or antenna arrays associated with the base station 105 may be located in diverse geographic locations.

The base station 105 may have an antenna array with a number of rows and columns of antenna ports that the base station 105 may use to support beamforming of communications with the UE 115. Likewise, the UE 115 may have one or more antenna arrays that may support various multiple-input multiple-output or beamforming operations. Additionally, or alternatively, an antenna panel may support radio frequency beamforming for a signal transmitted via one or more antenna ports. The base station 105 and the UE 115 may thus be configured to support beamformed communications 205 using the multiple antennas and over a communication link 210. Examples of a communication link 210 include a downlink channel or an uplink channels, or a combination thereof. For example, the base station 105 may transmit, and the UE 115 may receive, downlink transmissions on a downlink channel, such as a physical downlink control channel or a physical downlink shared channel, or a combination thereof. Likewise, the UE 115 may transmit, and the base station 105 may receive, uplink transmissions on an uplink channel, such as a physical uplink control channel (PUCCH) or a physical uplink shared channel (PUSCH), or a combination thereof.

The base station 105 and the UE 115 may communicate via the beamformed communications 205 using multiple component carriers. For example, the base station 105 and the UE 115 may be configured to support multiple downlink component carriers and multiple uplink component carriers.

The base station 105 and the UE 115 may be configured to support the beamformed communications 205 over a carrier bandwidth, for example, a radio frequency spectrum band, one or more radio frequency spectrum subbands, and the like, or may be configured to support the beamformed communications 205. A radio frequency spectrum band may include a wideband. A radio frequency spectrum subband also may include a wideband or a narrowband, or the like.

The base station 105 and the UE 115 may, in some implementations, support subband beamformed communications. The base station 105 and the UE 115 may, in some implementations, support TDD operations and FDD operations in an unpaired spectrum or a paired spectrum. An unpaired spectrum provides a single subband or a single band for both downlink communications and uplink communications. A paired spectrum provides a distinct subband or band for downlink communications and uplink communications. For example, the wireless communications system 200 may have a block of radio frequency spectrum in a lower radio frequency spectrum band and an associated block of radio frequency spectrum in an upper radio frequency spectrum band. This arrangement of radio frequency spectrum bands with one band for the uplink communications and one band for the downlink communications is referred to as paired spectrum.

In the wireless communication system 200, the UE 115 may perform channel and interference measurements to maintain or improve the beamformed communications 205 with the base station 105. The UE 115 may be configured with a CSI report configuration, as described in FIG. 3, including various resource settings that the device may select and use to generate a CSI report based on channel and interference measurements performed in accordance with the selected resource setting. As illustrated in FIG. 2, the UE 115 may, in some implementations, be exposed to mTRP such as, base stations 105, and the like, which may impact the reliability of the beamformed communications 205, for example, downlink reception and uplink transmission at the UE 115. The UE 115 may be configured to provide an mTRP CSI report, which corresponds to a CSI report associated with more than one TCI state. In some implementations, the UE 115 may be configured to use a single resource, which may relate to antenna port groups, where each antenna port group relates to one TCI state. For example, some antenna ports of the resource might correspond to one directional beam, and other ports of the resource may correspond to another directional beam. In some other implementations, two resources may be linked and an mTRP CSI hypothesis may correspond to the pair of resources.

In the wireless communication system 200, the UE 115 may be configured to use CMR for mTRP CSI as an NZP-IMR or CSIIM resource for a sTRP CSI, to reduce messaging overhead, as well as resource overhead for the device. The UE 115 may be configured with a pair of CMRs used for a first CSI hypothesis corresponding to a first directional beam such as, a first TCI state, and a second directional beam, such as a second TCI state for channel measurement and a CSIIM resource for interference measurement. The UE 115 may be additionally configured with a second CSI hypothesis corresponding to the first TCI state exclusively or a third CSI hypotheses corresponding to the second TCI state exclusively. In some examples, the UE 115 may select a CMR for a channel measurement based on a CSI hypothesis and select a CSIIM resource or another CMR for an interference measurement based on the CSI hypothesis. The other CMR may be an NZP-IMR or the CSIIM resource. In some other examples, the UE 115 may select an antenna port group for a channel measurement based on a CSI hypothesis and select a CSIIM resource or another antenna port group for an interference measurement based on the CSI hypothesis.

Figure 3:
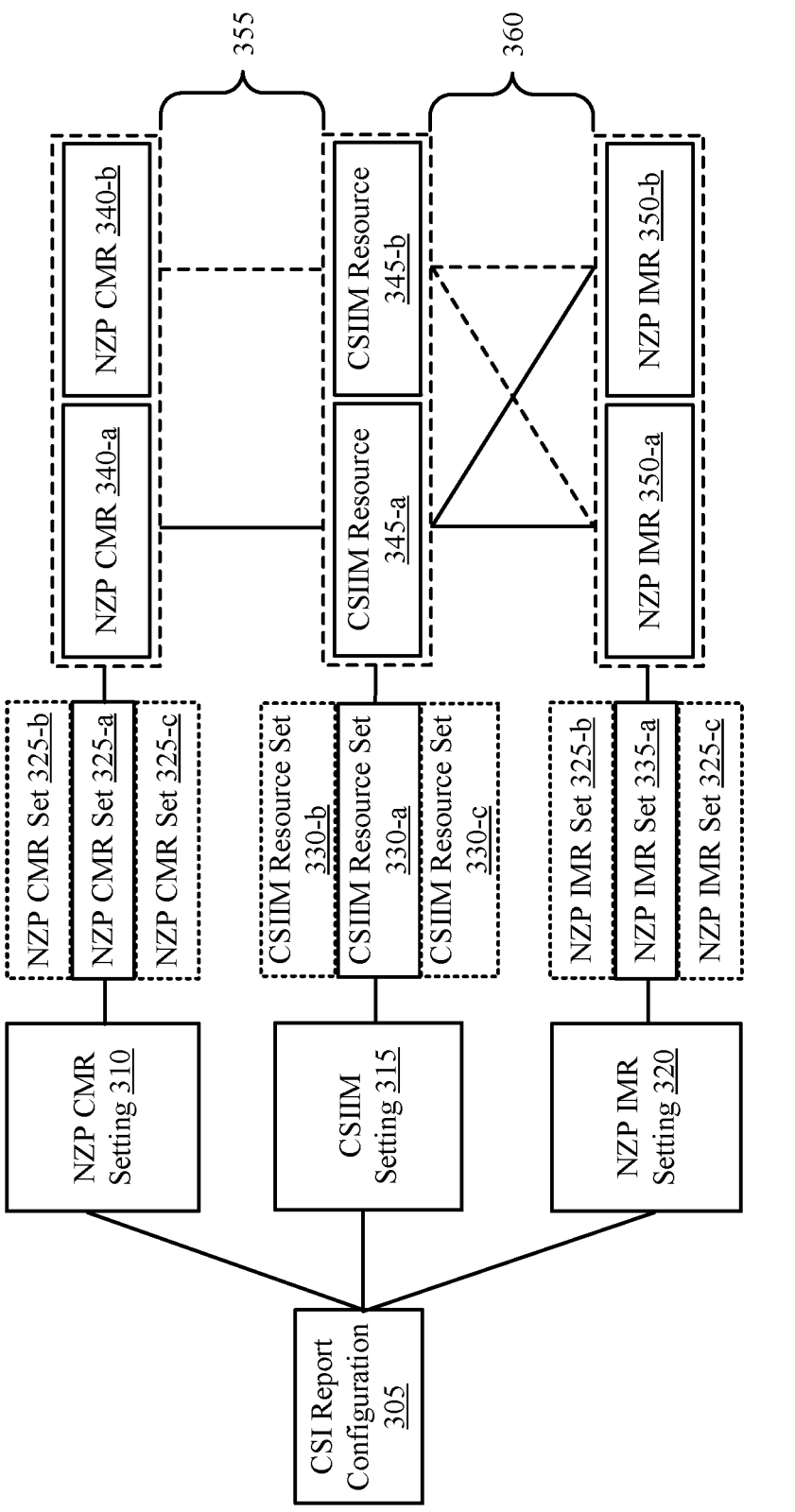
FIG. 3 illustrates an example of a CSI report configuration framework that supports resource selection for single and multiple TRP CSI reporting.

FIG. 3 illustrates an example of a CSI report configuration framework 300 that supports resource selection for single and multiple TRP CSI reporting. The CSI report configuration framework 300 may implement aspects of the wireless communications system 100 and the wireless communication system 200 as described in FIGS. 1 and 2, respectively. For example, the CSI report configuration framework 300 may be implemented by a UE 115 and a base station 105 in a CSI reporting procedure, as described with reference to FIGS. 1 and 2. The CSI report configuration framework 300 may illustrate a process in which a UE 115 receives a CSI report configuration 305 from the network (for example, from a base station 105) that may indicate one or more resources to use for a CSI measurement.

A UE 115 may measure CSI for one or more potential signal paths, such as one or more communication links as described with reference to FIGS. 1 and 2, respectively. For example, the UE 115 may measure a CSI-RS and may use the measurements to perform channel estimation. The CSI-RS transmissions the UE 115 measures may be periodic CSI-RS transmissions, aperiodic CSI-RS transmissions, semi-persistent CSI-RS transmissions, or a combination. The UE 115 transmit a CSI report to a base station 105 including one or more parameters based on the CSI measurements.

The CSI report may include, in some implementations, one or more precoding matrix indicators (PMIs), rank indicators (RIs), layer indicators (LIs), channel quality indicators (CQIs), reference signal received power (RSRP) measurements (for example, Layer 1-RSRPs (L1-RSRPs)), signal to interference plus noise (SINR) measurements (for example, L1-SINRs), or the like. In some implementations, the UE 115 may perform periodic CSI reporting (for example, the base station 105 may transmit higher layer signaling scheduling periodic CSI reports), aperiodic CSI reporting (for example, the base station 105 may dynamically configure a CSI report), semi-persistent CSI reporting (for example, the base station 105 may transmit higher layer signaling scheduling periodic CSI reports and may use dynamic signaling to trigger the periodic CSI reporting), or a combination.

The UE 115 may receive a control message indicating the CSI report configuration 305 corresponding to one or more resources (for example, CSI measurement resources) over which the UE 115 may monitor for two or more reference signals. For example, the UE 115 may receive the control message, such as RRC signaling, MAC-CE signaling, DCI signaling, or the like, including the CSI report configuration 305 (which may be equivalently referred to as a "CSI report config") that may link to one or more resource settings associated with different measurement types. The CSI report configuration 305 may link to a setting for one or more of a non-zero power (NZP) CSI-RS resource for channel measurement (CMR) 310, a CSI-RS resource for interference measurement (CSIIM) 315, or an NZP CSI-RS for interference measurement (NZP IMR) 320, or any combination thereof. Each resource setting of the one or more resource settings to which the CSI report configuration 305 links may be associated with multiple resources sets, but one active resource set (for example, one active resource set).

The NZP-CMR setting 310 may be associated with one or more NZP CMR sets 325. For example, an NZP CMR set 325-*a* may be the active resource set, while an NZP CMR set 325-b and an NZP CMR set 325-c may be inactive resource sets. Similarly, the CSIIM resource setting 315 may be associated with one or more CSIIM resource set 330. For example, a CSIIM resource set 330-a may be the active resource set, while a CSIIM resource set 330-b and a CSIIM resource sets 330-c may be inactive resource sets. Similarly, the NZP IMR setting 320 may be associated with one or more NZP IMR sets 335. For example, an NZP IMR set 335-a may be the active resource set, while an NZP IMR set 335-b and an NZP IMR set 335-c may be inactive resource sets.

Each resource set may have one or more resources, which may be referred to as CSI-RS resources or CSI measurement resources. For example, the NZP CMR set 325-a may include one or more resources, such as one or more NZP CMRs 340 (for example, ab NZP CMR 340-a and an NZP CMR 340-b). In some aspects, the NZP CMR 340-a may be associated with a TCI state a (for example, a first TCI state) and the NZP CMR 340-b may be associated with a TCI state b (for example, a second TCI state). Similarly, the CSIIM resource set 330-a may include one or more resources, such as one or more CSIIM resources 345 (for example, a CSIIM resource 345-a and a CSIIM resource 345-b). Similarly, the NZP IMR set 335-a may include one or more resources, such as one or more NZP IMRs 350 (for example, an NZP IMR 350-a and an NZP IMR 350-b). In some examples, each CSI measurement resource within a resource set may be referred to as a CSI hypothesis.

The UE 115 may select one NZP CMR 340 out of the one or more NZP-CMRs 340 to use for reporting CSI. The UE 115 may report the selected CMR 340 in a CSI-RS resource indicator (CRI) field as part of the CSI feedback so that a receiving TRP or a serving base station 105 knows to which NZP CMR 340 the reported CSI corresponds. Based on the selected NZP CMR 340, the UE 115 also may implicitly select a resource from the one or more CSIIM resources 345 (for example, the CSIIM resource 345-a or the CSIIM resource 345-b) and one or more NZP IMRs 350 (for example, the NZP IMR 350-a, the NZP IMR 350-b, or both). For example, an NZP CMR 340 may feature a resource-wise association 355 with a CSIIM resource 345, such that one NZP-CMR 340 is associated with one CSIIM resource 345. For example, the NZP CMR 340-a may be associated with the CSIIM resource 345-a and the NZP CMR 340-b may be associated with the CSIIM resource 345-b. Additionally, each NZP CMR 340 may feature a resource-wise association 360 with all NZP IMRs 350 collectively, such that the NZP CMR 340-a and the NZP CMR 340-b may both be associated with the NZP IMR 350-a and the NZP IMR 350-b.

As illustrated, in the CSI report configuration framework 300, there may be a one-to-one mapping between each CMR or each CSI hypothesis (for example, each CRI), and each CSIIM resource. In other words, each CSI-RS resource for channel measurement may be resource-wise associated with a CSIIM resource based in part on the ordering of the CSI-RS resource and the CSIIM resource in the corresponding resource set. The number of CSI-RS resources for channel measurement may be equal to the number of CSIIM resources. In some implementations, the UE 115 may measure an interference by measuring the energy in the CSIIM resource (for example, no RS estimation). A CSIIM resource configuration might include resource elements for the UE 115 to measure the interference. The NZP-IMR (NZP CSI-RS resource for interference measurement) may be associated with all CMRs in a resource setting unlink CSIIM.

The UE 115 also may include NZP CSI-RS ports configured for interference measurement. Each NZP CSI-RS port configured for interference measurement may correspond to an interference transmission layer. The UE 115 may estimate each port of the NZP CSI-RS resource for interference measurement and each port corresponding to one interference transmission layer. In some implementations, a port of NZP-IMR may be beamformed and used for measuring multi-user (MU) interference. The NZP-IMR and CSIIM may be configured with the same quasi co-location parameter (for example, same QCL Type D) corresponding to the same directional beam (for example, a receive beam or a transmit beam) as the corresponding CMR resource.

Figure 4:
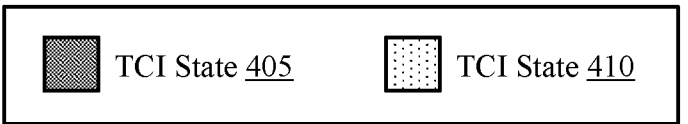
FIGS. 4-6 illustrate examples of resource schemes that support resource selection for single and multiple TRP CSI reporting.
Figure 4:
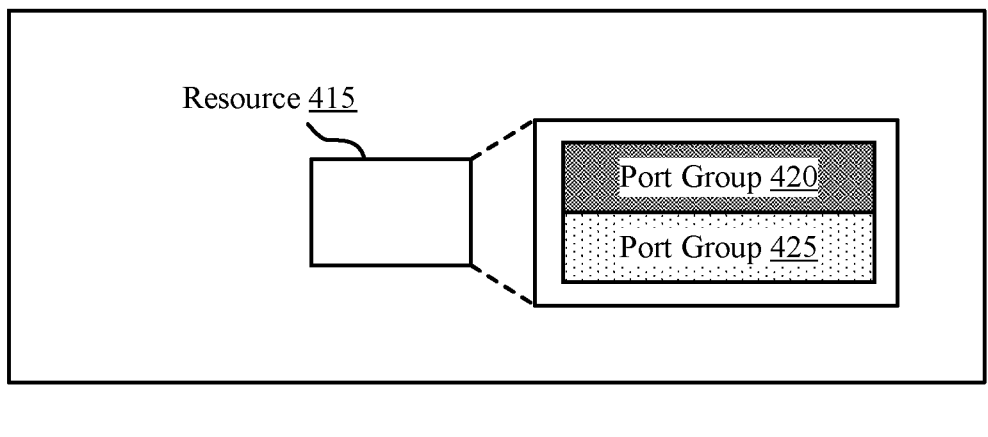
Figure 4:
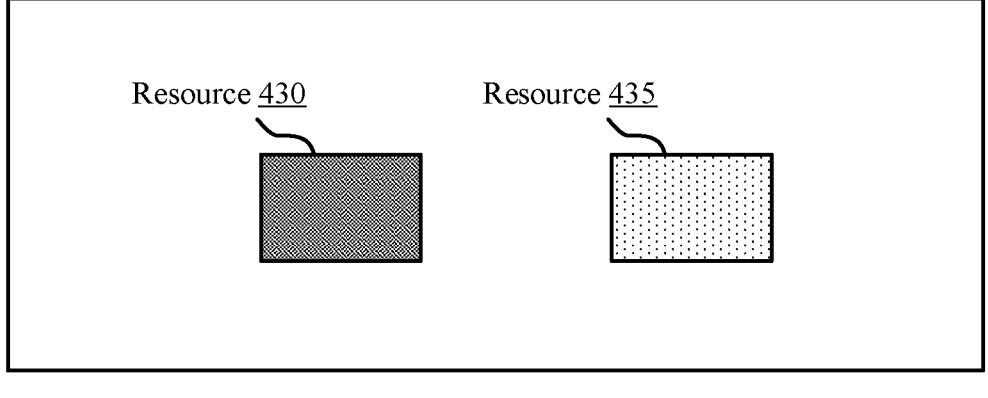
Figure 4:

FIG. 4 illustrates example of resource schemes 400 and 401 that support resource selection for single and multiple TRP CSI reporting. The resource scheme 400 and the resource scheme 401 may be implemented to realize aspects of the wireless communications system 100 or the wireless communications system 200 as described in FIGS. 1 and 2, respectively. The resource scheme 400 and the resource scheme 401 may be based on a configuration by a base station 105 and implemented by a UE 115 for channel measurement or interference measurement, or both. For example, multiple TRPs may transmit one or more reference signals (such as one or more CSI-RSs) to a UE 115 over a single CSI-RS resource associated with multiple port groups, each port group associated with a different TCI state, or over multiple CSI-RS resources, each CSI-RS resource associated with a different TCI state. In some implementations, the UE 115 may perform a channel measurement or an interference measurement, or both, based on whether the multiple TRPs transmit the one or more reference signals over the single resource or over the multiple resources.

With reference to FIGS. 2 and 4, the UE 115 may operate within a multi-TRP system and may receive joint transmissions from multiple TRPs. In some examples, the UE 115 may receive a reference signal (such as a CSI-RS) from each of two TRPs that each apply a different TCI state. For example, the UE 115 may receive a first reference signal from a first TRP according to a TCI state 405 and may receive a second reference signal from a second TRP according to a TCI state 410. In such examples, the UE 115 may generate a CSI report, which also may be referred to as a multi-TRP or an mTRP CSI report, that includes CSI associated with more than one TCI state (for example, the TCI state 405 and the TCI state 410). In some examples, either of the two TRPs or the UE 115 may select a CSI hypothesis according to which the UE 115 is to generate the CSI report and each CSI hypothesis (and corresponding CSI report) may correspond to two or more TCI states (as opposed to a single TCI state). In some aspects, selecting the CSI hypothesis may include selecting the CSI hypothesis out of multiple TCI states, which may correspond to multiple CSI-RS resources in a resource set. Such CSI reporting may satisfy an objective of a further enhanced MIMO (FeMIMO) work item that is associated with beamforming and beam steering.

The first TRP and the second TRP (for example, base stations 105 in FIGS. 1 and 2) may employ various approaches to jointly transmit reference signals to the UE 115 such that the UE 115 may generate the CSI report (a CSI report across the first TCI state and the second TCI state). For example, the first TRP and the second TRP may employ a first approach in which the two TRPs transmit reference signals over a single resource, such as a resource 415 as illustrated by the resource scheme 400. Alternatively, the first TRP and the second TRP may employ a second approach in which the two TRPs transmit reference signals over separate resources, such as a resource 430 and a resource 435 as illustrated by the resource scheme 401. In either approach, the UE 115 may use the resource or resources over which the multiple TRPs may transmit for channel measurement or interference measurement.

In the first approach, as illustrated by the resource scheme 400, the resource 415 may include multiple (such as two) CSI-RS port groups including a port group 420 and a port group 425 that are each associated with one TCI state. For example, the port group 420 may be associated with the TCI state 405 and the port group 425 may be associated with the TCI state 410. In other words, a first set of ports of the resource 415 (a CSI-RS resource) may have or otherwise be associated with the TCI state 405 and, as such, may be included within the port group 420. Similarly, a second set of ports of the resource 415 may have or otherwise be associated with the TCI state 410 and, as such, may be included within the port group 425. Accordingly, in the first approach, the first TRP applying the TCI state 405 and the second TRP applying the TCI state 410 may transmit reference signals over the resource 415 and the UE 115 may generate a CSI report based on receiving or measuring the reference signals received over the resource 415. Further, based on employing the first approach, a quantity of multi-TRP CSI hypotheses may be equal to a quantity of CSI-RS resources with multiple CSI-RS port groups. Therefore, in the first approach, a single CSI-RS resource may include two port groups with each port group is associated with a single TCI state. Some ports of the CSI-RS resource have a first TCI state (for example, first port group) and other ports of the CSI-RS resource have a second TCI state (for example, second port group).

In the second approach, as illustrated by the resource scheme 401, the resource 430 and the resource 435 may each be associated with a different TCI state. For example, the resource 430 may be associated with the TCI state 405 and the resource 435 may be associated with the TCI state 410. In some aspects, the resource 430 and the resource 435 may be linked as a resource pair (for example, a CSI-RS resource pair) and a CSI hypothesis may correspond to both of the resource 430 and the resource 435. In other words, the CSI hypothesis may correspond to the resource pair. As such, in the second approach, a quantity of multi-TRP CSI hypotheses may be equal to a quantity of CSI-RS resource pairs. Accordingly, in the second approach, the first TRP applying the TCI state 405 may transmit a reference signal over the resource 430 and the second TRP applying the TCI state 410 may transmit a reference signal over the resource 435 and the UE 115 may generate a CSI report based on receiving or measuring the reference signals received over the resource 430 and the resource 435. Details relating to the first approach and the second approach are further illustrated by Table 1, shown below. Therefore, in the second approach, two CSI-RS resources may be linked and an mTRP CSI hypothesis correspond to the pair of CSI-RS resources.

TABLE 1

| CSI Resource Scheme | | |
| --- | --- | --- |
| | First Approach | Second Approach |
| # of CSI-RS resources for multi-TRP CSI hypothesis | 1 | 2 |
| # of TCI states per CSI-RS resource | 2 | 1 |
| Total # of multi-TRP CSI hypotheses | # of CSI-RS resources with two port groups | # of pairs of linked CSI-RS resources |

Figure 5:
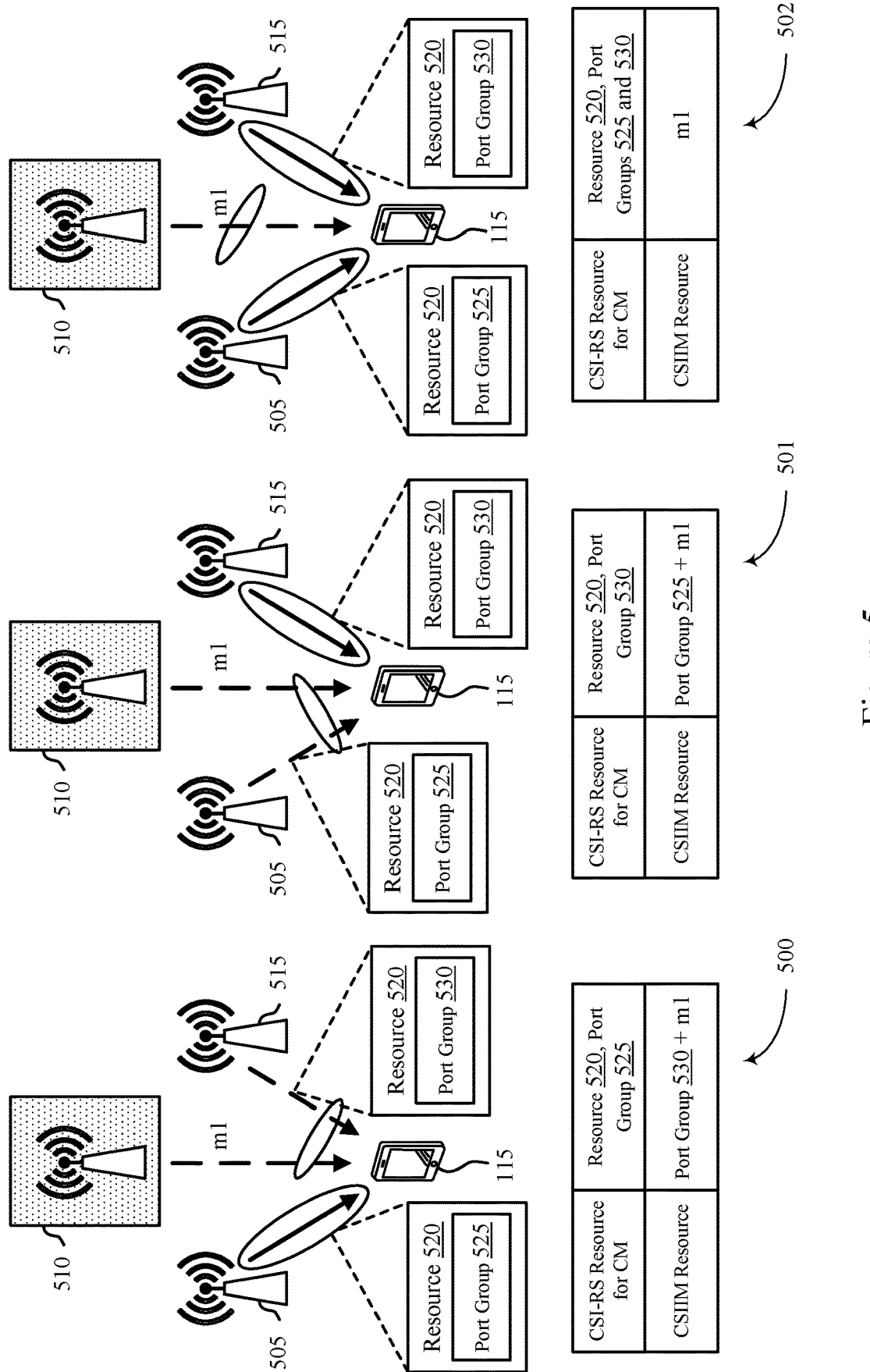

FIG. 5 illustrates an example of resource schemes 500, 501, and 502 that support resource selection for single and multiple TRP CSI reporting. The resource scheme 500, the resource scheme 501, and the resource scheme 502 may implement aspects of the wireless communications system 100 and the wireless communications system 200 described with reference to FIGS. 1 and 2, respectively. The resource scheme 500, the resource scheme 501, and the resource scheme 502 may be based on a configuration by a base station 105 and implemented by a UE 115 for channel measurement or interference measurement, or both.

With reference to the resource schemes 500 corresponding to a second CSI hypothesis of a set of hypotheses, one or more TRPs 505, 510, and 515 may employ various approaches to jointly transmit reference signals to a UE 115 such that the UE 115 may generate the CSI report (a CSI report across a single TCI state or across multiple TCI states). In the first approach, as illustrated by the resource scheme 500, a resource 520 may include multiple (such as two) CSI-RS port groups including a port group 525 and a port group 530 that are each associated with one TCI state. The resource 520 and the port group 525 may be configured for channel measurements (for example, CSI-RS resource for channel measurements) associated with the one or more TRPs 505, 510, and 515. The UE 115 may use the resource 520 and the port group 530 plus m1 (for example, CSIIM resource) for interference measurements associated with the one or more TRPs 505, 510, and 515. Therefore, using CSIIM resource m1 for the mTRP CSI hypothesis (TRP 505 and TRP 515), two other CSIIM resources for the same CMR may be needed for the two sTRP hypotheses (TRP 505, and TRP 515). In the second approach, as illustrated by the resource scheme 500, the resource 520 may be associated with a different TCI state. That is, two CMRs are associated with three CSIIM (one for each CMR, and another for both CMRs).

With reference to the resource schemes 501 corresponding to a third CSI hypothesis of a set of hypotheses, one or more TRPs 505, 510, and 515 may employ various approaches to jointly transmit reference signals to a UE 115 such that the UE 115 may generate the CSI report (a CSI report across a single TCI state or across multiple TCI states). In the first approach, as illustrated by the resource scheme 501, a resource 520 may include multiple (such as two) CSI-RS port groups including a port group 525 and a port group 530 that are each associated with one TCI state. The resource 520 and the port group 530 may be configured for channel measurements (for example, CSI-RS resource for channel measurements) associated with the one or more TRPs 505, 510, and 515. The UE 115 may use the resource 520 and the port group 525 plus m1 (for example, CSIIM resource) for interference measurements associated with the one or more TRPs 505, 510, and 515. Therefore, using CSIIM resource m1 for the mTRP CSI hypothesis (TRP 505 and TRP 515), two other CSIIM resources for the same CMR may be needed for the two sTRP hypotheses (TRP 505, and TRP 515). In the second approach, as illustrated by the resource scheme 500, the resource 520 may be associated with a different TCI state. That is, two CMRs are associated with three CSIIM (one for each CMR, and another for both CMRs).

With reference to the resource schemes 502 corresponding to a first CSI hypothesis of a set of hypotheses, one or more TRPs 505, 510, and 515 may employ various approaches to jointly transmit reference signals to a UE 115 such that the UE 115 may generate the CSI report (a CSI report across a single TCI state or across multiple TCI states). In the first approach, as illustrated by the resource scheme 502, a resource 520 may include multiple (such as two) CSI-RS port groups including a port group 525 and a port group 530 that are each associated with one TCI state. The resource 520, the port group 525, and the port group 530 may be configured for channel measurements (for example, CSI-RS resource for channel measurements) associated with the one or more TRPs 505, 510, and 515. The UE 115 may use m1 (for example, CSIIM resource) for interference measurements associated with the one or more TRPs 505, 510, and 515. Therefore, using CSIIM resource m1 for the mTRP CSI hypothesis (TRP 505 and TRP 515), two other CSIIM resources for the same CMR may be needed for the two sTRP hypotheses (TRP 505, and TRP 515). In the second approach, as illustrated by the resource scheme 500, the resource 520 may be associated with a different TCI state. That is, two CMRs are associated with three CSIIM (one for each CMR, and another for both CMRs).

In the example of FIG. 5, if the various approaches are followed the UE 115 may experience an increase in signaling overhead (for example, RRC signaling overhead), as well as resource overhead may be increased, as three CSIIM resources are needed for the three CSI hypotheses. The UE 115 may be configured to determine use of a port group (in approach 1) or a CSI-RS resource (in approach 2) configured for CMR of an mTRP CSI hypothesis for CSIIM resource or NZP-IMR of a sTRP hypothesis, or both. This may eliminate the need for configuring a dedicated CSIIM resource for the two sTRP hypotheses. In some implementations, the UE 115 may determine whether the UE 115 use NZP CSI-RS as NZP-IMR. NZP CMR of one TRP might include non-beamformed ports. Each CSI-RS port also may be treated as one interference layer.

Figure 6:
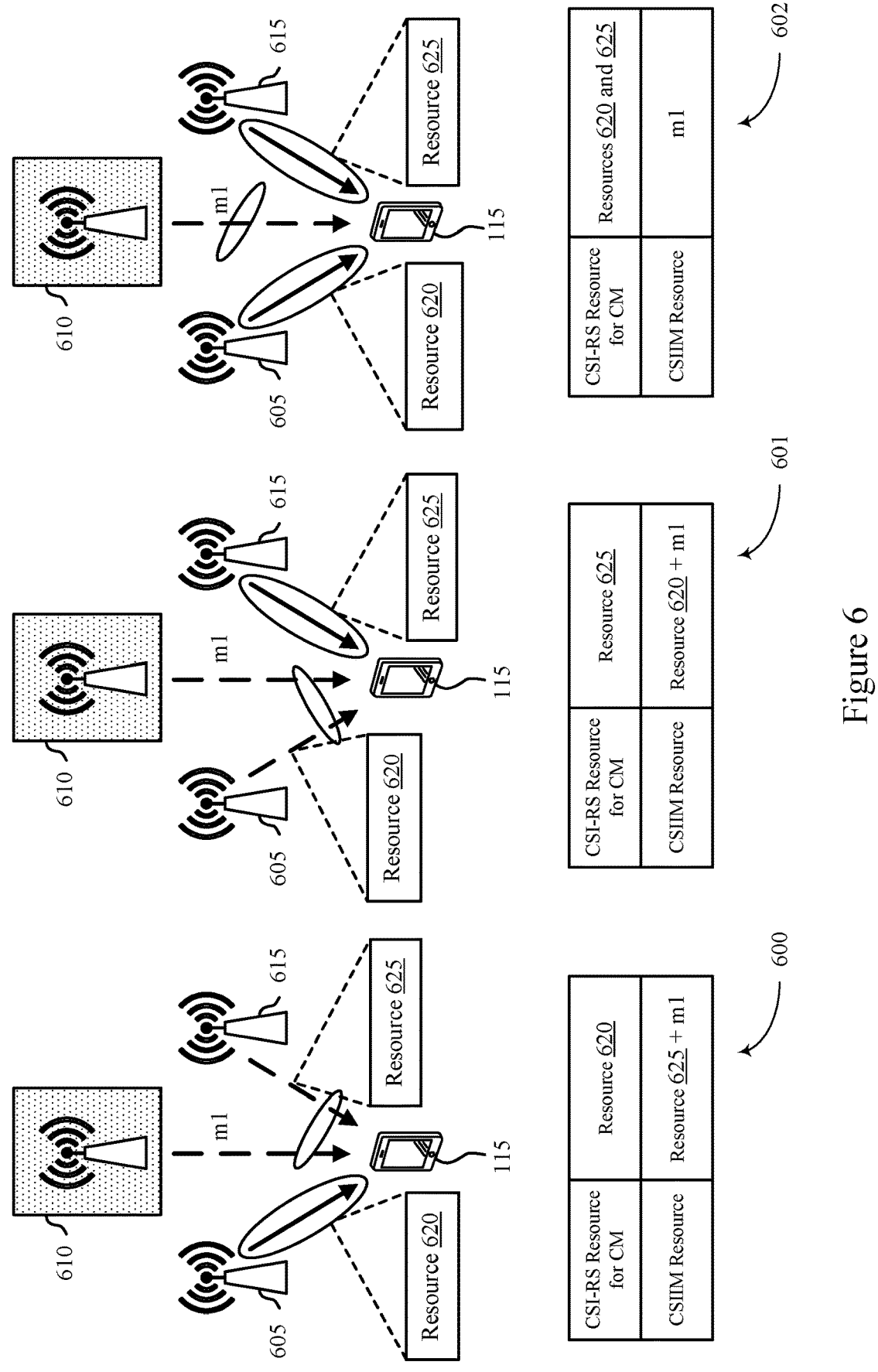

FIG. 6 illustrates an examples of resource schemes 600, 601, and 602 that supports resource selection for single and multiple TRP CSI reporting. The resource scheme 600, the resource scheme 601, and the resource scheme 602 may implement aspects of the wireless communications system 100 and the wireless communications system 200 described with reference to FIGS. 1 and 2, respectively. The resource scheme 600, the resource scheme 601, and the resource scheme 602 may be based on a configuration by a base station 105 and implemented by a UE 115 to promote power saving by the UE when performing channel measurement or interference measurement, or both. The UE 115 may be configured to support dynamic point selection in which for a sTRP hypothesis corresponding to TRP 605, the interference from 615 is assumed. Additionally, or alternatively, the UE 115 may be configured to support dynamic point blanking in which for a sTRP hypothesis corresponding to TRP 605 and TRP 615 is assumed to be muted.

The UE 115 may be configured with a configuration including one or more CSI measurement resources for channel measurement associated with a set of CSI hypotheses corresponding to the resource schemes 600, 601, and 602. For example, the resource scheme 602 corresponds to a first CSI hypothesis of the set of CSI hypotheses that may correspond to a first TCI state and a second TCI state of the set of TCI states for the channel measurement. The resource scheme 600 may correspond to a second CSI hypothesis of the set of CSI hypotheses that may correspond to the first TCI state. The resource scheme 601 may correspond to a third CSI hypothesis of the set of CSI hypotheses may correspond to the second TCI state. The set of CSI hypotheses may thereby correspond to a set of TCI states or a CSIIM resource for interference measurement, or both.

The UE 115 may select a first CSI measurement resource (referred to as CMR0) for a channel measurement based on a CSI hypothesis of the set of CSI hypotheses. The UE 115 also may select a CSIIM resource or a second CSI measurement resource (referred to as CMR1) for an interference measurement based on the CSI hypothesis of the set of CSI hypotheses. In some implementations, CMR1 may include an NZP-IMR or the CSIIM resource. With reference to the resource schemes 600, 601, and 602, one or more of TRP 605, TRP 610, and TRP 615 may employ various approaches to jointly transmit reference signals to a UE 115 such that the UE 115 may generate the CSI report (a CSI report across a single TCI state or across multiple TCI states, or a combination thereof).

In one approach, a pair of resources, such as a pair of CMRs including a CMR0 (for example, a resource 620) and a CMR1 (for example, a resource 625) may be used for a first CSI hypothesis corresponding to transmission from the TRP 605 (for example, a first TCI state) and the TRP 615 (for example, a second TCI state) for channel measurements and a CSIIM resource m1 (if any) for interference measurement. The UE 115 may be additionally, or alternatively, configured with a second CSI hypothesis corresponding to the TRP 605 or a third CSI hypotheses corresponding to the TRP 615. For the second CSI hypothesis, the CMR0 (for example, a resource 620) may be used for channel measurement. For interference measurement, if the UE 115 is configured with a dedicated CSIIM resource (for example, a CSIIM resource m2) for the second CSI hypothesis, this CSIIM resource may be used by the UE 115 for interference measurement. Otherwise, the UE 115 may be configured with one or more of the following UE behaviors for channel measurement or interference measurement, or both. The UE behavior may be based on a static configuration (for example, via RRC configuration) or dynamically configured via RRC signaling, MAC-CE signaling, or DCI signaling, or any combination thereof.

The UE 115 may support dynamic point selection operations, for example, in which the UE 115 presumes interference from a TRP, such as the TRP 615. In some implementations, the CMR1 (for example, a resource 625) may be used by the UE 115 as NZP-IMR for the second CSI hypothesis. In some implementations, different power control offset ratios may be defined and configured when the CMR1 is used as NZP-IMR compared to when it is used as CMR. For example, both a first power control ratio and as second power control ratios may be used for interference measurement. When this resource is used for interference measurement (as NZP-IMR) the second power control ratio can be configured and used compared to when it is used for channel measurement (for example, it is used as CMR for first CSI hypothesis or the third CSI hypothesis, but it is not used as CMR for the second CSI hypothesis).

In some implementations, the CMR1 (for example, a resource 625) may be used by the UE 115 as CSIIM for the second CSI hypothesis. In some examples, each port of the NZP CSI-RS of CMR1 (for example, a resource 625) may correspond to an interference layer. The UE 115 may either measure an energy in CMR1, or estimate each port individually and add them without considering each port as a separate interference layer. In other implementations, CMR1 with a number (N) of NZP CSI-RS ports may correlate to be interference with n layers, where n is greater than N (for example, N=8, n=2). The value n, in some implementations, may be configured by the base station 105.

A group of NZP CSI-RS port may be collectively grouped as one interference layer (for example, block diagonal precoding assumed for transforming a number of ports to a number of layers). The UE 115 may be configured to select a precoder to transform the number of NZP CSI-RS ports to the number of layers. The UE 115 may be configured to apply random precoding in each subband to transform the number of NZP CSI-RS ports to the number of layers in that subband, and determine an average across the subbands. The UE 115, in some implementations, may apply partial random precoding. For example, a first precoding matrix W1 may be configured for wideband, but the UE selects a random second precoding matrix W2 per subband, where precoding used to transfer the number of ports to the number of layers is W=W1*W2 (such as, similar to semi-open loop precoding). The value of the number of NZP CSI-RS ports (N), the number of interference layers (n), or the precoder W or W1, or both can be RRC configured and indicated, for example, by MAC-CE. For example, the UE 115 may be configured with a list, and the MAC-CE may indicate one of them in the list for the UE 115. Thus, the precoding matrix may include a wideband precoding matrix and a subband precoding matrix (per subband), where the wideband precoding matrix is configured for the UE 115 and the subband precoding matrix is randomly selected by the UE 115 in each subband.

The UE 115 may additionally, or alternatively, support dynamic point blanking operations, for example, in which the UE 115 presumes no interference from a TRP, such as the TRP 615. That is, TRP 615 is presumed to be muted. In some implementations, the CMR1 (for example, a resource 625) may not be used by the UE 115 for the interference measurement. In some other implementations, the UE 115 may be configured to estimate NZP CSI-RS ports for the CMR1 (for example, a resource 625), and determines the remaining interference after subtracting the estimated ports of CMR1 in the CMR1 resource elements. The UE 115 may thereby estimate the ports, and then subtract them from the total energy in the resource elements of the second CSI-RS resource (so that the interference from the ports is not considered as interference) for the second CSI hypothesis as this is for dynamic point blanking operations by the UE 115, where the second TRP is assumed to be muted.

The UE 115 may be configured to use CSIIM resource m1 (which is for the first CSI hypothesis) as additional interference (in addition to the interference in implementations above) for the second CSI hypothesis. For the third CSI hypothesis, the CMR1 may be used for channel measurement. For interference measurement similar to the above (for example, the TRP 605 and the TRP 615 roles and corresponding CMRs are reversed). Here, the UE 115 may use CSIIM resource m1 (which is for the first CSI hypothesis) as additional interference (in addition to the interference determined) for the second CSI hypothesis. In addition, this UE behavior (whether to use CSIIM resource m1 as additional interference resource) can be configurable (network can configure whether UE 115 considers this as additional interference or not).

In another approach, the UE 115 may be configured to support the above, except of CMR0 and CMR1, the UE 115 uses port group 0 (corresponding to the TRP 605 (for example, a first TCI state) and port group 1 (corresponding to the TRP 615 (for example, a second TCI state). In some implementations, when CMR1 (or port group 1) is used for interference measurement for the second CSI hypothesis (corresponding to TRP 605), the same QCL-TypeD of the CMR0 (or port group 0) is assumed for CMR1 (or port group 1). This means that interference may be measured with the same receive beam or the same UE 115 panel that is used to measure the channel. Hence, the QCL-TypeD of the second TCI state configured for CMR1 is ignored when it is used as interference measurement for the first TCI state (first TRP). That is the CMR1 (or port group 1) is configured with a QCL-TypeD. But when the CMR1 (or port group 1) is used as interference measurement, the configured QCL-TypeD of this resource is not used. Instead, the QCL-TypeD of the CMR0 is used. This is because for the second CSI hypothesis, both channel measurement (using first CMR) and interference measurement (using second CMR) should be with the same receive beam (same QCL-TypeD).

Figure 7:
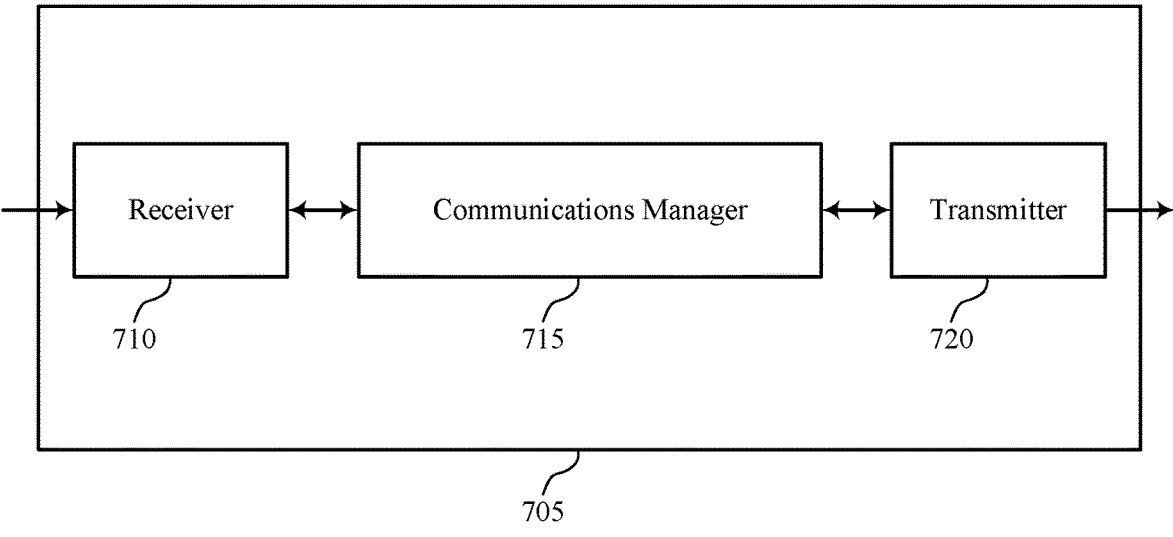
FIGS. 7 and 8 show block diagrams of example devices that support resource selection for single and multiple TRP CSI reporting.

FIG. 7 shows a block diagram 700 of a device 705 that supports resource selection for single and multiple TRP CSI reporting. The device 705 may be an example of aspects of a UE 115 as described herein. The device 705 may include a receiver 710, a communications manager 715, and a transmitter 720. The device 705 also may include a processor. Each of these components may be in communication with one another (such as, via one or more buses).

The receiver 710 may receive information such as packets, user data, or control information associated with various information channels (such as, control channels, data channels, and information related to using a CMR for mTRP CSI as a NZP-IMR or CSIIM resource for a sTRP CSI). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive a configuration including one or more CSI measurement resources associated with a set of CSI hypotheses. The set of CSI hypotheses corresponds to a set of TCI states, or a CSIIM resource, or both. The communications manager 715 may select a first CSI measurement resource of the one or more CSI measurement resources for a channel measurement based on a CSI hypothesis of the set of CSI hypotheses. The communications manager 715 may select the CSIIM resource or a second CSI measurement resource for an interference measurement based on the CSI hypothesis of the set of CSI hypotheses, and transmit a report based on the channel measurement or the interference measurement, or both.

The communications manager 715 also may receive a configuration including one or more CSI-RS port groups associated with a set of CSI hypotheses corresponding to a set of TCI states. The communications manager 715 may select a first CSI-RS port group for a channel measurement based on a CSI hypothesis of the set of CSI hypotheses. The communications manager 715 may select a second CSI-RS port group for an interference measurement based on the CSI hypothesis of the set of CSI hypotheses. The communications manager 715 may transmit a report based on the channel measurement or the interference measurement, or both. The communications manager 715 may be an example of aspects of the communications manager 1010 described herein.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

In some implementations, the communications manager 715, when functioning as or implemented by a processor or a processing system, may obtain signaling from the receiver 710, using a first interface and may output signaling for transmission via the transmitter 720 using the first interface or a second interface.

Figure 8:

FIG. 8 shows a block diagram 800 of a device 805 that supports resource selection for single and multiple TRP CSI reporting. The device 805 may be an example of aspects of a device 705, or a UE 115 as described herein. The device 805 may include a receiver 810, a communications manager 815, and a transmitter 840. The device 805 also may include a processor. Each of these components may be in communication with one another (such as, via one or more buses).

The receiver 810 may receive information such as packets, user data, or control information associated with various information channels (such as, control channels, data channels, and information related to using a CMR for mTRP CSI as a NZP-IMR or CSIIM resource for a sTRP CSI). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a configuration component 820, a resource component 825, a report component 830, and a port component 835. The communications manager 815 may be an example of aspects of the communications manager 1010 described herein.

The configuration component 820 may receive a configuration including one or more CSI measurement resources associated with a set of CSI hypotheses, where the set of CSI hypotheses corresponds to a set of TCI states, or a CSIIM resource, or both. The resource component 825 may select a first CSI measurement resource of the one or more CSI measurement resources for a channel measurement based on a CSI hypothesis of the set of CSI hypotheses and select the CSIIM resource or a second CSI measurement resource for an interference measurement based on the CSI hypothesis of the set of CSI hypotheses. The report component 830 may transmit a report based on the channel measurement or the interference measurement, or both.

The port component 835 may receive a configuration including one or more CSI-RS port groups associated with a set of CSI hypotheses corresponding to a set of TCI states, select a first CSI-RS port group for a channel measurement based on a CSI hypothesis of the set of CSI hypotheses, and select a second CSI-RS port group for an interference measurement based on the CSI hypothesis of the set of CSI hypotheses. The report component 830 may transmit a report based on the channel measurement or the interference measurement, or both.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
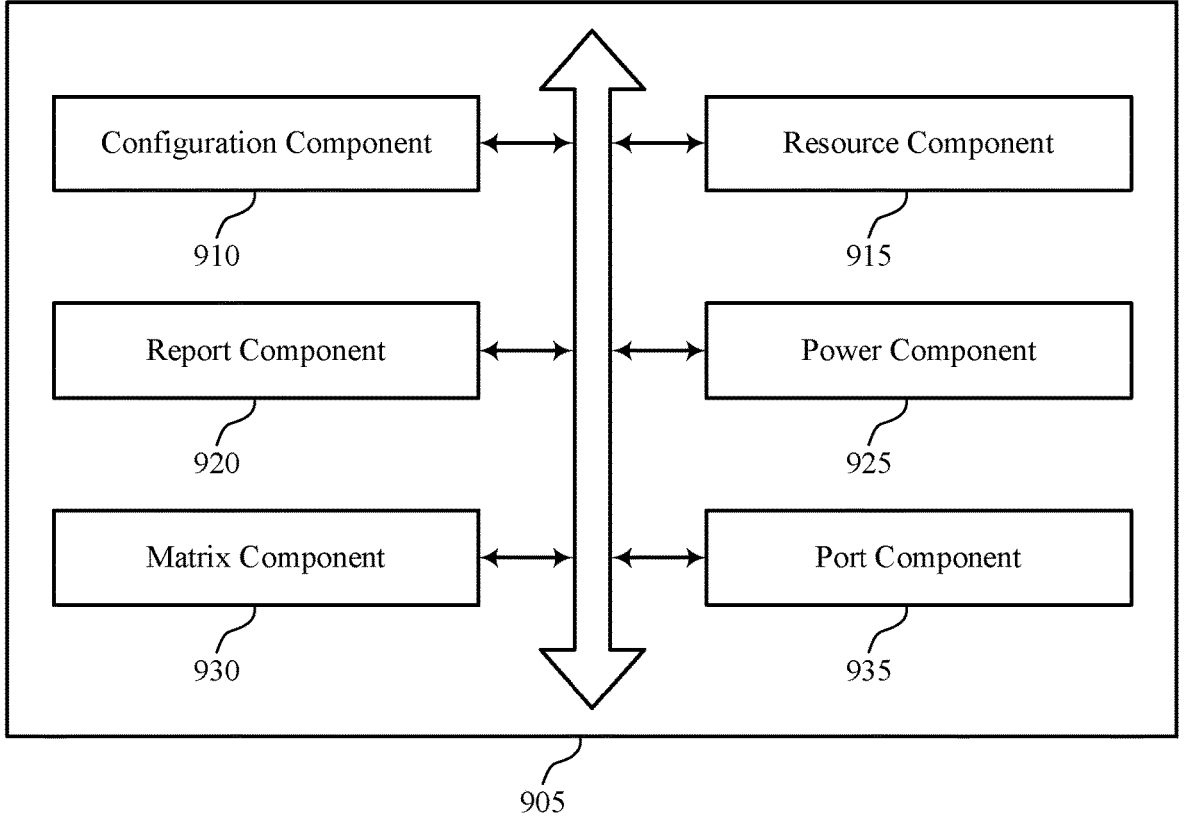
FIG. 9 shows a block diagram of an example communi-cations manager that supports resource selection for single and multiple TRP CSI reporting.
Figure 9:

FIG. 9 shows a block diagram 900 of a communications manager 905 that supports resource selection for single and multiple TRP CSI reporting. The communications manager 905 may be an example of aspects of a communications manager 715, a communications manager 815, or a communications manager 1010 described herein. The communications manager 905 may include a configuration component 910, a resource component 915, a report component 920, a power component 925, a matrix component 930, and a port component 935. Each of these modules may communicate, directly or indirectly, with one another (such as, via one or more buses).

The configuration component 910 may receive a configuration including one or more CSI measurement resources associated with a set of CSI hypotheses, where the set of CSI hypotheses corresponds to a set of TCI states, or a CSIIM resource, or both. In some examples, the configuration component 910 may receive an RRC message, a MAC-CE message, or a DCI message including the configuration. In some implementations, a first CSI hypothesis of the set of CSI hypotheses corresponds to a first TCI state and a second TCI state of the set of TCI states for the channel measurement. In some implementations, a second CSI hypothesis of the set of CSI hypotheses corresponds to the first TCI state. In some implementations, a third CSI hypothesis of the set of CSI hypotheses corresponds to the second TCI state.

The resource component 915 may select a first CSI measurement resource of the one or more CSI measurement resources for a channel measurement based on a CSI hypothesis of the set of CSI hypotheses. In some examples, the resource component 915 may select the CSIIM resource or a second CSI measurement resource for an interference measurement based on the CSI hypothesis of the set of CSI hypotheses. In some examples, the resource component 915 may select, based on the configuration, the first CSI measurement resource for the second CSI hypothesis corresponding to the first TCI state for the channel measurement.

In some examples, the resource component 915 may determine a configured CSIIM resource for the second CSI hypothesis. In some examples, the resource component 915 may determine to use the CSIIM resource for the interference measurement. In some examples, the resource component 915 may select, based on a dynamic point selection of the second TCI state, the second CSI measurement resource as an NZP-IMR for the second CSI hypothesis. In some examples, the resource component 915 may select, based on a dynamic point selection of the second TCI state, the second CSI measurement resource as the CSIIM resource for the second CSI hypothesis. In some examples, the resource component 915 may measure an energy ratio associated with the second CSI measurement resource based on using the second CSI measurement resource as the CSIIM resource for the second CSI hypothesis.

In some examples, the resource component 915 may select, based on a dynamic point selection of the second TCI state, the second CSI measurement resource as an NZP-IMR for the second CSI hypothesis. In some examples, the resource component 915 may estimate an energy ratio associated with each CSI-RS port based on using the second CSI measurement resource as the NZP-IMR for the second CSI hypothesis. In some examples, the resource component 915 may aggregate the energy ratio associated with each CSI-RS port. In some examples, the resource component 915 may determine, based on a dynamic point selection of the second TCI state, that the second CSI measurement resource associated with a set of NZP CSI-RS ports corresponds to a set of interference layers.

In some examples, the resource component 915 may determine a dynamic point blanking of the second TCI state. In some examples, the resource component 915 may determine to refrain from using the second CSI measurement resource for the interference measurement based on the dynamic point blanking of the second TCI state. In some examples, the resource component 915 may estimate an interference associated with a set of NZP CSI-RS ports associated with the second CSI measurement resource. In some examples, the resource component 915 may select, based on the configuration, the second CSI measurement resource for the third CSI hypothesis corresponding to the second TCI state for the channel measurement.

In some examples, the resource component 915 may determine a configured CSIIM resource for the third CSI hypothesis. In some examples, the resource component 915 may select, based on a dynamic point selection of the first TCI state, the second CSI measurement resource as an NZP-IMR for the third CSI hypothesis. In some examples, the resource component 915 may select, based on a dynamic point selection of the first TCI state, the second CSI measurement resource as the CSIIM resource for the third CSI hypothesis. In some examples, the resource component 915 may measure an energy ratio associated with the second CSI measurement resource based on using the second CSI measurement resource as the CSIIM resource for the third CSI hypothesis.

In some examples, the resource component 915 may select, based on a dynamic point selection of the first TCI state, the second CSI measurement resource as an NZP-IMR for the third CSI hypothesis. In some examples, the resource component 915 may estimate an energy ratio associated with each CSI-RS port based on using the second CSI measurement resource as the NZP-IMR for the third CSI hypothesis. In some examples, the resource component 915 may determine, based on a dynamic point selection of the first TCI state, that the second CSI measurement resource associated with a set of NZP CSI-RS ports corresponds to a set of interference layers.

In some examples, the resource component 915 may determine that the second CSI measurement resource is configured with a second quasi-colocation parameter. In some examples, the resource component 915 may determine that the second CSI measurement resource is used for the interference measurement. In some examples, the resource component 915 may refrain from using the second quasi-colocation parameter for the second CSI measurement resource based on that the second CSI measurement resource is used for the interference measurement. In some examples, the resource component 915 may select a first quasi-colocation parameter associated with the first CSI measurement resource for the second CSI measurement resource.

In some examples, the resource component 915 may select the CSIIM resource associated with a first CSI hypothesis for the interference measurement for a second CSI hypothesis, where the UE determines that the CSIIM resource is an additional interference resource based on the configuration. In some examples, the resource component 915 may determine a configured CSIIM resource for the second CSI hypothesis. In some examples, the resource component 915 may determine to use the CSIIM resource for the interference measurement. In some examples, the resource component 915 may select, based on a dynamic point selection of the second TCI state, the second CSI-RS port group as an NZP-IMR for the second CSI hypothesis. In some examples, the resource component 915 may determine a first power control offset ratio for the interference measurement based on selecting the second CSI-RS port group as the NZP-IMR. In some examples, the resource component 915 may determine a second power control offset ratio for the channel measurement based on selecting the second CSI-RS port group, where the first power control offset ratio is different from the second power control offset ratio. In some examples, the resource component 915 may select the CSIIM resource associated with the first CSI hypothesis for the interference measurement for the second CSI hypothesis, where the UE determines that the CSIIM resource is an additional interference resource based on the configuration. In some examples, the resource component 915 may determine a configured CSIIM resource for the third CSI hypothesis.

In some implementations, the second CSI measurement resource includes an NZP-IMR or the CSIIM resource. In some implementations, the one or more CSI measurement resources includes the first CSI measurement resource or the second CSI measurement resource, or both. In some implementations, each CSI-RS port of an NZP CSI-RS associated with the second CSI measurement resource includes a single interference layer. In some implementations, the set of interference layers is configured for the UE. In some implementations, a subset of NZP CSI-RS ports of the set of NZP CSI-RS ports correspond to a single interference layer of the set of interference layers. In some implementations, a precoder to transform the set of NZP CSI-RS ports to the set of interference layers is preconfigured. In some implementations, the first CSI measurement resource and the second CSI measurement resource correspond to a same quasi-colocation parameter. In some implementations, an NZP CSI-RS associated with the second CSI-RS port group includes a single interference layer.

The report component 920 may transmit a report based on the channel measurement or the interference measurement, or both. In some examples, the report component 920 may transmit a report based on the channel measurement or the interference measurement, or both. The port component 935 may receive a configuration including one or more CSI-RS port groups associated with a set of CSI hypotheses corresponding to a set of TCI states. In some examples, the port component 935 may select a first CSI-RS port group for a channel measurement based on a CSI hypothesis of the set of CSI hypotheses. In some examples, the port component 935 may select a second CSI-RS port group for an interference measurement based on the CSI hypothesis of the set of CSI hypotheses. In some examples, the port component 935 may select, based on the configuration, the first CSI-RS port group for the second CSI hypothesis corresponding to the first TCI state for the channel measurement. In some examples, the port component 935 may select, based on a dynamic point selection of the second TCI state, the second CSI-RS port group as a CSIIM resource for the second CSI hypothesis.

In some examples, the port component 935 may measure an energy ratio associated with the second CSI-RS port group based on using the second CSI-RS port group as the CSIIM resource for the second CSI hypothesis. In some examples, the port component 935 may select, based on a dynamic point selection of the second TCI state, the second CSI-RS port group as an NZP-IMR for the second CSI hypothesis. In some examples, the port component 935 may estimate an energy ratio associated with the one or more CSI-RS port groups based on using the second CSI-RS port group as the NZP-IMR for the second CSI hypothesis. In some examples, the port component 935 may aggregate the energy ratio associated with the one or more CSI-RS port groups.

In some examples, the port component 935 may determine, based on a dynamic point selection of the second TCI state, that the second CSI-RS port group associated with a set of NZP CSI-RS ports corresponds to a set of interference layers. In some examples, the port component 935 may determine a dynamic point blanking of the second TCI state. In some examples, the port component 935 may determine to refrain from using the second CSI-RS port group for the interference measurement based on the dynamic point blanking of the second TCI state. In some examples, the port component 935 may estimate an interference associated with a set of NZP CSI-RS ports associated with the second CSI-RS port group. In some examples, the port component 935 may select, based on the configuration, the second CSI-RS port group for the third CSI hypothesis corresponding to the second TCI state for the channel measurement.

In some examples, the port component 935 may select, based on a dynamic point selection of the first TCI state, the second CSI-RS port group as an NZP-IMR for the third CSI hypothesis. In some examples, the port component 935 may select, based on a dynamic point selection of the first TCI state, the second CSI-RS port group as a CSIIM resource for the third CSI hypothesis. In some examples, the port component 935 may measure an energy ratio associated with the second CSI-RS port group based on using the second CSI-RS port group as the CSIIM resource for the third CSI hypothesis. In some examples, the port component 935 may select, based on a dynamic point selection of the first TCI state, the second CSI-RS port group as an NZP-IMR for the third CSI hypothesis. In some examples, the port component 935 may estimate an energy ratio based on using the second CSI-RS port group as the NZP-IMR for the third CSI hypothesis. In some examples, the port component 935 may aggregate the energy ratio.

In some examples, the port component 935 may determine, based on a dynamic point selection of the first TCI state, that the second CSI-RS port group associated with a set of NZP CSI-RS ports corresponds to a set of interference layers. In some examples, the port component 935 may determine that the second CSI-RS port group is configured with a second quasi-colocation parameter. In some examples, the port component 935 may determine that the second CSI-RS port group is used for the interference measurement. In some examples, the port component 935 may refrain from using the second quasi-colocation parameter for the second CSI-RS port group based on that the second CSI-RS port group is used for the interference measurement. In some examples, the port component 935 may select a first quasi-colocation parameter associated with the first CSI-RS port group for the second CSI-RS port group.

In some implementations, a first CSI hypothesis of the set of CSI hypotheses corresponds to a first TCI state and a second TCI state of the set of TCI states for the channel measurement. In some implementations, a second CSI hypothesis of the set of CSI hypotheses corresponds to the first TCI state. In some implementations, a third CSI hypothesis of the set of CSI hypotheses corresponds to the second TCI state. In some implementations, the one or more CSI-RS port groups includes the first CSI-RS port group or the second CSI-RS port group, or both. In some implementations, the first CSI-RS port group and the second CSI-RS port group correspond to a same quasi-colocation parameter.

In some implementations, the set of interference layers is configured for the UE. In some implementations, a subset of NZP CSI-RS ports of the set of NZP CSI-RS ports correspond to a single interference layer of the set of interference layers. In some implementations, a precoder to transform the set of NZP CSI-RS ports to the set of interference layers is preconfigured. In some implementations, each CSI-RS port of an NZP CSI-RS associated with the second CSI-RS port group includes a single interference layer.

The power component 925 may determine a first power control offset ratio associated with a CSI-RS port for the interference measurement based on selecting the second CSI measurement resource as the NZP-IMR. In some examples, the power component 925 may determine a second power control offset ratio associated with the CSI-RS port for the channel measurement based on selecting the second CSI measurement resource, where the first power control offset ratio is different from the second power control offset ratio. In some examples, the power component 925 may determine a first power control offset ratio for the interference measurement based on selecting the second CSI-RS port group as the NZP-IMR. In some examples, the power component 925 may determine a second power control offset ratio for the channel measurement based on selecting the second CSI-RS port group, where the first power control offset ratio is different from the second power control offset ratio.

The matrix component 930 may select a precoding matrix to transform the set of NZP CSI-RS ports to the set of interference layers. In some examples, the matrix component 930 may transform, in each band or subband, the set of NZP CSI-RS ports to the set of interference layers based on a random precoding operation. In some examples, the matrix component 930 may determine an average of the transformed set of NZP CSI-RS ports to the set of interference layers. In some examples, the matrix component 930 may select a precoding matrix to transform the set of NZP CSI-RS ports to the set of interference layers. In some examples, the matrix component 930 may transform, in each radio frequency spectrum band or subband, the set of NZP CSI-RS ports to the set of interference layers based on a partial random precoding operation including a first precoding matrix or a second precoding matrix, or a combination thereof. In some examples, the matrix component 930 may transform, in each radio frequency spectrum band or subband, the set of NZP CSI-RS ports to the set of interference layers based on a random precoding operation.

In some examples, the matrix component 930 may determine an average of the set of NZP CSI-RS ports to the set of interference layers based on the transforming. In some examples, the matrix component 930 may transform, in each band or subband, the set of NZP CSI-RS ports to the set of interference layers based on a partial random precoding operation including a first precoding matrix or a second precoding matrix, or a combination thereof. In some examples, the matrix component 930 may select a precoding matrix to transform the set of NZP CSI-RS ports to the set of interference layers. In some examples, the matrix component 930 may transform, in each radio frequency spectrum band or subband, the set of NZP CSI-RS ports to the set of interference layers based on a random precoding operation. In some examples, the matrix component 930 may determine an average of the transformed set of NZP CSI-RS ports to the set of interference layers.

In some examples, the matrix component 930 may select a precoding matrix to transform the set of NZP CSI-RS ports to the set of interference layers. In some examples, the matrix component 930 may transform, in each radio frequency spectrum band or subband, the set of NZP CSI-RS ports to the set of interference layers based on a partial random precoding operation including a first precoding matrix or a second precoding matrix, or a combination thereof. In some examples, the matrix component 930 may determine an average of the set of NZP CSI-RS ports to the set of interference layers based on the transforming. In some implementations, the precoding matrix includes a wideband precoding matrix and a subband precoding matrix per subband, the wideband precoding matrix is configured for the UE and the subband precoding matrix is randomly selected by the UE in each subband. In some implementations, a precoder to transform the set of NZP CSI-RS ports to the set of interference layers is preconfigured. In some implementations, the precoding matrix includes a wideband precoding matrix, the wideband precoding matrix is configured for the UE. In some implementations, the precoding matrix includes a wideband precoding matrix and a subband precoding matrix per subband, the wideband precoding matrix is configured for the UE and the subband precoding matrix is randomly selected by the UE in each subband.

Figure 10:
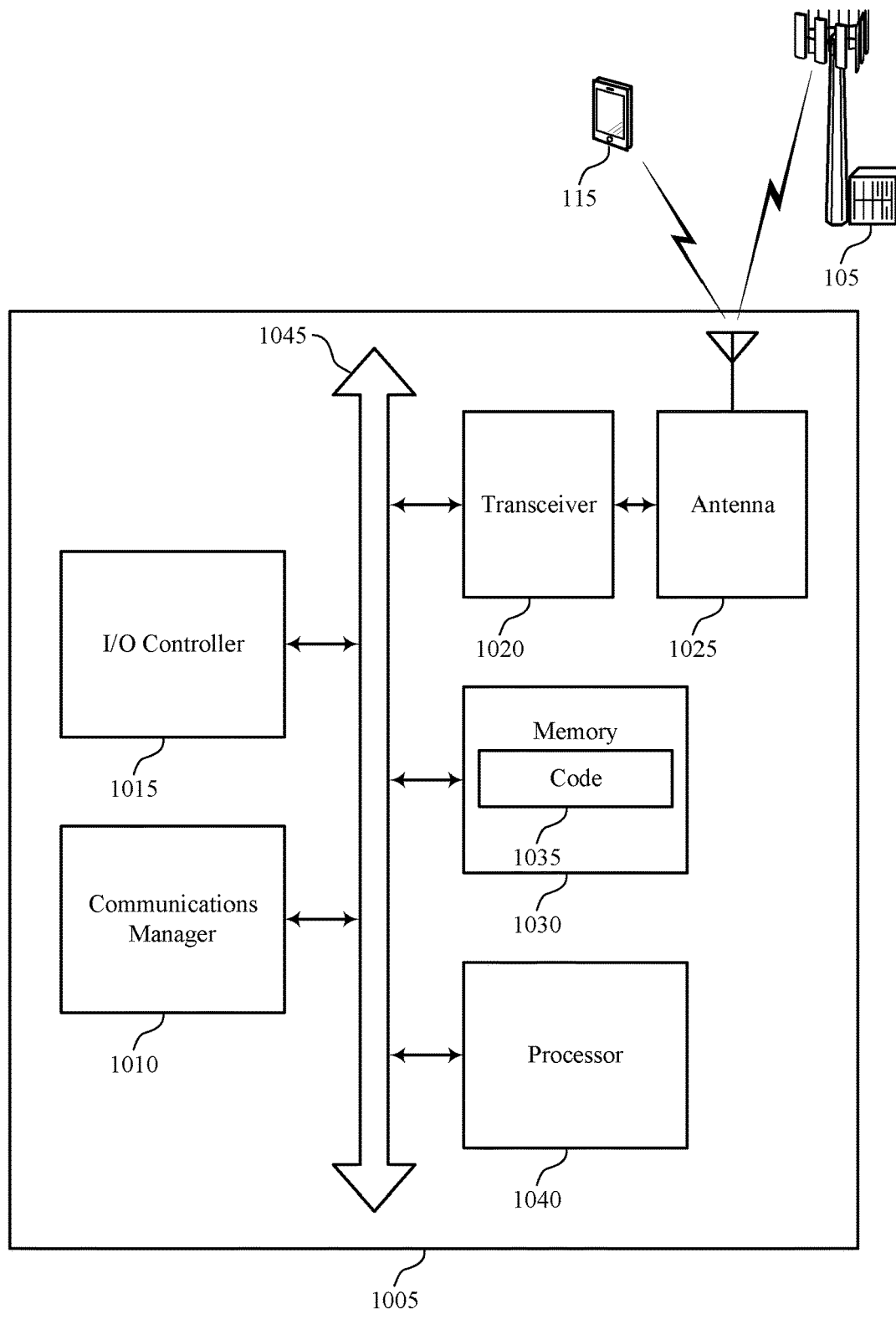
FIG. 10 shows a diagram of a system including an example device that supports resource selection for single and multiple TRP CSI reporting.

FIG. 10 shows a diagram of a system 1000 including a device 1005 that supports resource selection for single and multiple TRP CSI reporting. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (such as, bus 1045).

The communications manager 1010 may receive a configuration including one or more CSI measurement resources associated with a set of CSI hypotheses. The set of CSI hypotheses corresponds to a set of TCI states, or a CSIIM resource, or both. The communications manager 1010 may select a first CSI measurement resource of the one or more CSI measurement resources for a channel measurement based on a CSI hypothesis of the set of CSI hypotheses. The communications manager 1010 may additionally, or alternatively, select the CSIIM resource or a second CSI measurement resource for an interference measurement based on the CSI hypothesis of the set of CSI hypotheses. The communications manager 1010 may transmit a report based on the channel measurement or the interference measurement, or both.

The communications manager 1010 may, in some examples, when functioning as a processor or a processing system, may obtain signaling (for example, messages, indications, or any other signing that may be transmitted to the device 1005) to the transceiver 1020. For example, the communications manager 1010 may obtain a configuration (for example, an RRC configuration) including one or more CSI measurement resources associated with a set of CSI hypotheses. The communications manager 1310 also may output signaling (for example, messages, indications, or any other signing that may be transmitted by the device 1005) via the transceiver 1020. For example, the communications manager 1310 output a report based on the channel measurement or the interference measurement, or both.

The communications manager 1010 also may receive a configuration including one or more CSI-RS port groups associated with a set of CSI hypotheses corresponding to a set of TCI states. The communications manager 1010 may select a first CSI-RS port group for a channel measurement based on a CSI hypothesis of the set of CSI hypotheses. The communications manager 1010 also may select a second CSI-RS port group for an interference measurement based on the CSI hypothesis of the set of CSI hypotheses. The communications manager 1010 may transmit a report based on the channel measurement or the interference measurement, or both.

The communications manager 1010 may, in some examples, when functioning as a processor or a processing system, may obtain signaling (for example, messages, indications, or any other signing that may be transmitted to the device 1005) to the transceiver 1020. For example, the communications manager 1010 may obtain a configuration (for example, an RRC configuration) including one or more CSI-RS port groups associated with a set of CSI hypotheses corresponding to a set of TCI states. The communications manager 1310 also may output signaling (for example, messages, indications, or any other signing that may be transmitted by the device 1005) via the transceiver 1020. For example, the communications manager 1310 output a report based on the channel measurement or the interference measurement, or both.

The I/O controller 1015 may manage input and output signals for the device 1005. The I/O controller 1015 also may manage peripherals not integrated into the device 1005. In some implementations, the I/O controller 1015 may represent a physical connection or port to an external peripheral. In some implementations, the I/O controller 1015 may utilize an operating system such as iOS®, ANDROID®, MS-DOS®, MS-WINDOWS®, OS/2®, UNIX®, LINUX®, or another known operating system. In other implementations, the I/O controller 1015 may represent or interact with a modem, a keyboard, a mouse, a touchscreen, or a similar device. In some implementations, the I/O controller 1015 may be implemented as part of a processor. In some implementations, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 also may include a modem to modulate the packets and provide the modulated packets to the antennas for transmission, and to demodulate packets received from the antennas. In some implementations, the device 1005 may include a single antenna 1025. However, in some implementations the device 1005 may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor 1040 to perform various functions described herein. In some implementations, the memory 1030 may contain, among other things, a BIOS which may control basic hardware or software operation such as the interaction with peripheral components or devices. The code 1035 may include instructions to implement aspects of the present disclosure, including instructions to support wireless communications. The code 1035 may be stored in a non-transitory computer-readable medium such as system memory or other type of memory. In some implementations, the code 1035 may not be directly executable by the processor 1040 but may cause a computer (such as, when compiled and executed) to perform functions described herein.

The processor 1040 may include an intelligent hardware device, (such as, a general-purpose processor, a DSP, a CPU, a microcontroller, an ASIC, an FPGA, a programmable logic device, a discrete gate or transistor logic component, a discrete hardware component, or any combination thereof). In some implementations, the processor 1040 may be configured to operate a memory array using a memory controller. In other implementations, a memory controller may be integrated into the processor 1040. The processor 1040 may be configured to execute computer-readable instructions stored in a memory (such as, the memory 1030) to cause the device 1005 to perform various functions (such as, functions or tasks supporting using a CMR for mTRP CSI as a NZP-IMR or CSIIM resource for a sTRP CSI). In some implementations, the processor 1040 may be a component of a processing system. A processing system may generally refer to a system or series of machines or components that receives inputs and processes the inputs to produce a set of outputs (which may be passed to other systems or components of, for example, the device 1005). For example, a processing system of the device 1005 may refer to a system including the various other components or subcomponents of the device 1005.

FIG. 11 shows a flowchart illustrating a method 1100 that supports resource selection for single and multiple TRP CSI reporting. The operations of method 1100 may be implemented by a UE 115 or its components as described herein. For example, the operations of method 1100 may be performed by a communications manager as described with reference to FIGS. 7-10. In some examples, a UE 115 may execute a set of instructions to control the functional elements of the UE 115 to perform the functions described below. Additionally, or alternatively, a UE 115 may perform aspects of the functions described below using special-purpose hardware.

At block 1105, the UE may receive a configuration including one or more CSI measurement resources associated with a set of CSI hypotheses, where the set of CSI hypotheses corresponds to a set of TCI states, or a CSIIM resource, or both. The operations of block 1105 may be performed according to the methods described herein. In some examples, aspects of the operations of block 1105 may be performed by a configuration component as described with reference to FIGS. 7-10.

At block 1110, the UE may select a first CSI measurement resource of the one or more CSI measurement resources for a channel measurement based on a CSI hypothesis of the set of CSI hypotheses. The operations of block 1110 may be performed according to the methods described herein. In some examples, aspects of the operations of block 1110 may be performed by a resource component as described with reference to FIGS. 7-10.

At block 1115, the UE may select the CSIIM resource or a second CSI measurement resource for an interference measurement based on the CSI hypothesis of the set of CSI hypotheses. The operations of block 1115 may be performed according to the methods described herein. In some examples, aspects of the operations of block 1115 may be performed by a resource component as described with reference to FIGS. 7-10.

At block 1120, the UE may transmit a report based on the channel measurement or the interference measurement, or both. The operations of block 1120 may be performed according to the methods described herein. In some examples, aspects of the operations of block 1120 may be performed by a report component as described with reference to FIGS. 7-10.

FIG. 12 shows a flowchart illustrating a method 1200 that supports resource selection for single and multiple TRP CSI reporting. The operations of method 1200 may be implemented by a UE 115 or its components as described herein. For example, the operations of method 1200 may be performed by a communications manager as described with reference to FIGS. 7-10. In some examples, a UE 115 may execute a set of instructions to control the functional elements of the UE 115 to perform the functions described below. Additionally, or alternatively, a UE 115 may perform aspects of the functions described below using special-purpose hardware.

At block 1205, the UE may receive a configuration including one or more CSI-RS port groups associated with a set of CSI hypotheses corresponding to a set of TCI states. The operations of block 1205 may be performed according to the methods described herein. In some examples, aspects of the operations of block 1205 may be performed by a port component as described with reference to FIGS. 7-10.

At block 1210, the UE may select a first CSI-RS port group for a channel measurement based on a CSI hypothesis of the set of CSI hypotheses. The operations of block 1210 may be performed according to the methods described herein. In some examples, aspects of the operations of block 1210 may be performed by a port component as described with reference to FIGS. 7-10.

At block 1215, the UE may select a second CSI-RS port group for an interference measurement based on the CSI hypothesis of the set of CSI hypotheses. The operations of block 1215 may be performed according to the methods described herein. In some examples, aspects of the operations of block 1215 may be performed by a port component as described with reference to FIGS. 7-10.

At block 1220, the UE may transmit a report based on the channel measurement or the interference measurement, or both. The operations of block 1220 may be performed according to the methods described herein. In some examples, aspects of the operations of block 1220 may be performed by a report component as described with reference to FIGS. 7-10.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some implementations be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. A method for wireless communication at an apparatus of a user equipment (UE), comprising:

receiving a configuration including one or more channel state information (CSI) measurement resources associated with a set of CSI hypotheses, wherein the set of CSI hypotheses corresponds to a set of transmission configuration indicator (TCI) states, or a CSI interference measurement (CSIIM) resource, or both, wherein:

a first CSI hypothesis of the set of CSI hypotheses corresponds to a first TCI state and a second TCI state of the set of TCI states for a channel measurement;

a second CSI hypothesis of the set of CSI hypotheses corresponds to the first TCI state; and a third CSI hypothesis of the set of CSI hypotheses corresponds to the second TCI state;

selecting a first CSI measurement resource of the one or more CSI measurement resources for the channel measurement based at least in part on a CSI hypothesis of the set of CSI hypotheses;

selecting the CSIIM resource or a second CSI measurement resource for an interference measurement based at least in part on the CSI hypothesis of the set of CSI hypotheses, the one or more CSI measurement resources comprises the first CSI measurement resource or the second CSI measurement resource, or both; and transmitting a report based at least in part on the channel measurement or the interference measurement, or both.

2. The method of claim 1, wherein the second CSI measurement resource includes a non-zero power interference measurement resource (NZP-IMR) or the CSIIM resource.

3. The method of claim 1, further comprising:

selecting, based at least in part on the configuration, the first CSI measurement resource for the second CSI hypothesis corresponding to the first TCI state for the channel measurement.

4. The method of claim 3, further comprising:

determining a configured CSIIM resource for the second CSI hypothesis; and determining to use the CSIIM resource for the interference measurement.

5. The method of claim 3, wherein each CSI-RS port of a non-zero power CSI reference signal (NZP CSI-RS) associated with the second CSI measurement resource comprises a single interference layer, the method further comprising:

selecting, based at least in part on a dynamic point selection of the second TCI state, the second CSI measurement resource as an NZP-IMR for the second CSI hypothesis.

6. The method of claim 3, further comprising:

selecting, based at least in part on a dynamic point selection of the second TCI state, the second CSI measurement resource as the CSIIM resource for the second CSI hypothesis; and measuring an energy ratio associated with the second CSI measurement resource based at least in part on using the second CSI measurement resource as the CSIIM resource for the second CSI hypothesis.

7. The method of claim 3, further comprising:

selecting, based at least in part on a dynamic point selection of the second TCI state, the second CSI measurement resource as an NZP-IMR for the second CSI hypothesis;

estimating an energy ratio associated with each CSI-RS port based at least in part on using the second CSI measurement resource as the NZP-IMR for the second CSI hypothesis; and aggregating the energy ratio associated with each CSI-RS port.

8. The method of claim 3, further comprising:

determining, based at least in part on a dynamic point selection of the second TCI state, that the second CSI measurement resource associated with a set of non-zero power CSI reference signal (NZP CSI-RS) ports corresponds to a set of interference layers;

selecting a precoding matrix to transform the set of NZP CSI-RS ports to the set of interference layers; and transforming, in each radio frequency spectrum band or subband, the set of NZP CSI-RS ports to the set of interference layers based at least in part on a partial random precoding operation comprising a first precoding matrix or a second precoding matrix, or a combination thereof.

9. The method of claim 1, further comprising:

determining a dynamic point blanking of the second TCI state; and estimating an interference associated with a set of non-zero power CSI reference signal (NZP CSI-RS) ports associated with the second CSI measurement resource.

10. The method of claim 1, further comprising:

selecting, based at least in part on the configuration, the second CSI measurement resource for the second CSI hypothesis or the third CSI hypothesis, or both, corresponding to the second TCI state for the channel measurement, wherein the UE determines that the CSIIM resource is an additional interference resource based at least in part on the configuration.

11. The method of claim 10, further comprising:

determining a configured CSIIM resource for the third CSI hypothesis; and determining to use the CSIIM resource for the interference measurement.

12. The method of claim 10, further comprising:

selecting, based at least in part on a dynamic point selection of the first TCI state, the second CSI measurement resource as an NZP-IMR for the third CSI hypothesis.

13. The method of claim 12, wherein each CSI-RS port of a non-zero power CSI reference signal (NZP CSI-RS) associated with the second CSI measurement resource comprises a single interference layer, the method further comprising:

determining a first power control offset ratio associated with a CSI-RS port for the interference measurement based at least in part on selecting the second CSI measurement resource as the NZP-IMR; and determining a second power control offset ratio associated with the CSI-RS port for the channel measurement based at least in part on selecting the second CSI measurement resource, wherein the first power control offset ratio is different from the second power control offset ratio.

14. The method of claim 10, further comprising:

selecting, based at least in part on a dynamic point selection of the first TCI state, the second CSI measurement resource as the CSIIM resource for the third CSI hypothesis; and measuring an energy ratio associated with the second CSI measurement resource based at least in part on using the second CSI measurement resource as the CSIIM resource for the third CSI hypothesis.

15. The method of claim 10, further comprising:

selecting, based at least in part on a dynamic point selection of the first TCI state, the second CSI measurement resource as an NZP-IMR for the third CSI hypothesis;

estimating an energy ratio associated with each CSI-RS port based at least in part on using the second CSI measurement resource as the NZP-IMR for the third CSI hypothesis; and aggregating the energy ratio associated with each CSI-RS port.

16. The method of claim 10, further comprising:

determining, based at least in part on a dynamic point selection of the first TCI state, that the second CSI measurement resource associated with a set of non-zero power CSI reference signal (NZP CSI-RS) ports corresponds to a set of interference layers, wherein a subset of NZP CSI-RS ports of the set of NZP CSI-RS ports correspond to a single interference layer of the set of interference layers.

17. The method of claim 16, further comprising:
selecting a precoding matrix to transform the set of NZP CSI-RS ports to the set of interference layers;
transforming, in each radio frequency spectrum band or subband, the set of NZP CSI-RS ports to the set of interference layers based at least in part on a random precoding operation; and
determining an average of the set of NZP CSI-RS ports to the set of interference layers based at least in part on the transforming.

18. The method of claim 16, further comprising:
selecting a precoding matrix to transform the set of NZP CSI-RS ports to the set of interference layers; and
transforming, in each band or subband, the set of NZP CSI-RS ports to the set of interference layers based at least in part on a partial random precoding operation comprising a first precoding matrix or a second precoding matrix, or a combination thereof.

19. An apparatus for wireless communication at a user equipment (UE), comprising:
a first interface configured to:
receive a configuration including one or more channel state information (CSI) measurement resources associated with a set of CSI hypotheses, wherein the set of CSI hypotheses corresponds to a set of transmission configuration indicator (TCI) states, or a CSI interference measurement (CSIIM) resource, or both, wherein:
a first CSI hypothesis of the set of CSI hypotheses corresponds to a first TCI state and a second TCI state of the set of TCI states for a channel measurement;
a second CSI hypothesis of the set of CSI hypotheses corresponds to the first TCI state; and
a third CSI hypothesis of the set of CSI hypotheses corresponds to the second TCI state;
a processing system configured to:
select a first CSI measurement resource of the one or more CSI measurement resources for the channel measurement based at least in part on a CSI hypothesis of the set of CSI hypotheses; and
select the CSIIM resource or a second CSI measurement resource for an interference measurement based at least in part on the CSI hypothesis of the set of CSI hypotheses, the one or more CSI measurement resources comprises the first CSI measurement resource or the second CSI measurement resource, or both; and
wherein the first interface or a second interface is configured to:
output a report based at least in part on the channel measurement or the interference measurement, or both.

\* \* \* \* \*